(12) United States Patent
Parris et al.

(10) Patent No.: US 8,397,310 B2
(45) Date of Patent: Mar. 12, 2013

(54) SMART CONTAINER SYSTEM FOR CHARGING, STORING, AND USING ELECTRONIC DEVICES

(76) Inventors: Earl H. Parris, Summerville, GA (US); John Michael Kay, Rome, GA (US)

( * ) Notice: Subject to any disclaimer, the term of this patent is extended or adjusted under 35 U.S.C. 154(b) by 1935 days.

(21) Appl. No.: 11/248,030

(22) Filed: Oct. 11, 2005

(65) Prior Publication Data

US 2007/0083921 A1 Apr. 12, 2007

(51) Int. Cl.
*G08B 13/00* (2006.01)
(52) U.S. Cl. ......... 726/36; 726/35; 726/34; 340/539.22; 340/572.1; 340/572.4
(58) Field of Classification Search .................. 713/172, 713/185; 380/227, 230; 705/65, 69; 726/9, 726/5, 34; 206/524.8; 340/572.8; 209/702
See application file for complete search history.

(56) References Cited

U.S. PATENT DOCUMENTS

| | | | |
|---|---|---|---|
| 3,000,418 A | 9/1961 | Bitting | |
| 5,246,114 A | 9/1993 | Underwood | |
| 5,761,992 A | 6/1998 | Gallo | |
| 5,806,575 A | 9/1998 | Tsay | |
| 5,963,131 A | 10/1999 | D'Angelo et al. | |
| 6,240,295 B1 | 5/2001 | Kennedy, III et al. | |
| 6,377,825 B1 | 4/2002 | Kennedy | |
| 6,499,574 B1 | 12/2002 | Anthony | |
| 6,651,520 B1 | 11/2003 | Allen et al. | |
| 6,710,738 B2 | 3/2004 | Allen, Jr. | |
| 6,741,790 B1 | 5/2004 | Burgess | |
| 6,763,987 B1 | 7/2004 | Eberle | |
| 6,820,783 B2 | 11/2004 | Beale | |
| 6,825,751 B1 | 11/2004 | Kita et al. | |
| 6,825,875 B1 | 11/2004 | Strub et al. | |
| 6,829,656 B1 | 12/2004 | Szucs et al. | |
| 6,837,409 B2 | 1/2005 | Lemanski | |
| 6,838,998 B1 | 1/2005 | Brown et al. | |
| 6,844,815 B2 | 1/2005 | Chang | |
| 6,869,086 B2 | 3/2005 | Sadow | |
| 6,891,811 B1 | 5/2005 | Smith et al. | |
| 6,903,950 B2 | 6/2005 | Afzal et al. | |
| 6,924,748 B2 | 8/2005 | Obradovich et al. | |
| 6,937,135 B2 | 8/2005 | Kitson et al. | |
| 7,002,472 B2 * | 2/2006 | Stratmoen et al. | 340/539.26 |
| 7,295,119 B2 * | 11/2007 | Rappaport et al. | 340/572.4 |
| 7,482,928 B2 * | 1/2009 | Brackmann et al. | 340/572.1 |
| 2004/0099496 A1 * | 5/2004 | Hollingsworth | 190/111 |

(Continued)

OTHER PUBLICATIONS

Poliness, Edmund, "Recharge you mobile wherever you are," ABC Science Online, (Apr. 5, 2004).

(Continued)

*Primary Examiner* — Pramila Parthasarathy
(74) *Attorney, Agent, or Firm* — Monty Simmons; Simmons Patents

(57) ABSTRACT

The present invention is an apparatus and method for associating electronic devices to portable containers. A smart container is a container used for transporting items while traveling and comprising electronic devices. The smart container may comprise at least one module bay configured for receiving a module and a controller comprising a processing device associated with a memory. The controller is electrically associated with the module bay and configured for sending and/or receiving data to/from an electronic device associated with the module bay. The controller may be either an integral component of the smart container or a controller module removably received by the smart container. The smart container further comprises a power source associated with a power bus. The power bus is electrically associated with at least one of (a) a module bay, and (b) the controller.

26 Claims, 9 Drawing Sheets

U.S. PATENT DOCUMENTS

2004/0113786 A1* 6/2004 Maloney .................... 340/568.1
2005/0029149 A1* 2/2005 Leung et al. ............... 206/524.8
2006/0071786 A1* 4/2006 Fano ........................ 340/539.22

OTHER PUBLICATIONS

Hesseldahl, Arik, "Better Luggage Through Bluetooth," Forbes, (Nov. 11, 2002).

Alternative Energy, "Power Film 10w, 12v Thin Film Solar Panel", http://shop.altenergystore.com (date not known).

Catch-A-Call, "Wireless Driveway Alarm / Motion Detector," http://www.catchacallonline.com (date unknown).

Pimall, "World's Smallest Video Camera," http://pimall.com (date unknown).

\* cited by examiner

SMART CONTAINER SYSTEM FOR CHARGING, STORING, AND USING ELECTRONIC DEVICES

TECHNICAL FIELD OF THE INVENTION

The present invention relates to smart portable containers for transporting items while traveling comprising electronic devices. Such smart containers provide for centralized storage and use of electronic devices with modular embodiments of the invention being configurable to accommodate travelers anticipated needs.

BACKGROUND OF THE INVENTION

Since the invention of the solid state transistor, advances in electronic based technology have had a dramatic impact on human existence. Such solid state electronics provided a means for sending a man to the moon and probes across the galaxy. Electronic computing devices hundreds of times more powerful than the computers used to send a person to the moon are now commonly owned by ordinary people. Wireless communication devices that were once only props in science fiction movies are now commonly used. Indeed, such advances in electronic technology have been leveraged to improve the standard of living of the general populace to a level unthinkable just a few generations ago. One result of such advances is that most people routinely carry at least one electronic device, such as a cell phone, a PDA, electronic watch, a wireless remote for communication with a vehicle, a garage door opener, a DVD player, a music player (e.g. MP3), etc.

Travel is one area in particular that advancements in electronics have had a striking impact. Modern computing devices have given engineers the ability to design bigger and faster transportation devices, such as the modern jet. With the advent of such technology, long distance travel has become increasingly common. For example, as a result of affordable long distance travel, modern industries have been marked by a strong internationalization of their markets, requiring global business strategies to achieve effective cross-border markets. Such business strategies frequently require employees to travel, and when they travel, taking their electronic devices with them.

Similarly, when people go on vacation, affordable long distance travel provides the opportunity for the vacationer to visit in far off locations, perhaps in a foreign country. In fact, the tourism industry has reported a dramatic change in its structure over the last few years. Travelers' wish for more frequent, but shorter travel, last-minute reservations, global advice, and service quality. Electronic devices providing access to communication systems provide reliable information on facilities and services offered in unfamiliar locations. Such electronic devices allow the traveler to stay in touch with a service provider as well as consult various sources of information to assist them in their decision making processes.

Considering the above information at least two things seem certain; people are going to travel, and when they travel, they are going to take at least one electronic device with them. Examples of travelers include a business man on a business trip, a person on vacation, a hiker in the great outdoors, and a student moving between home and classes. When people travel, they frequently take a container for housing and transporting items. Luggage is a familiar device used by people to store and transport items they wish to take along with them while they travel. Hikers, for example, often carry their luggage on their backs in a container referred to as a backpack. Students also carry luggage known as book bags. Bikers may have a utility belt. The hiker, student, business traveler, and vacationer will likely have different luggage needs. Indeed, two different hikers may have different needs depending on their anticipated environment and/or destination. Thus, the devices that a traveler decides to take along on a trip may also vary. Consequently, the luggage needs of the traveler will likely be different depending on both the purpose of the travel and the travel destination.

Luggage (portable container) design is one area that has escaped the evolution resulting from the above described technological advances. Some prior art systems may have adapted somewhat to accommodate new ways of storing items during travel. However, such prior art systems have not adequately addressed the need for transporting various electronic devices frequently used by travelers. More specifically, what is needed is a smart container system that provides a centralized area for charging, storing, and/or using electronic devices. Additionally, such a smart luggage system should be configurable allowing the traveler to configure such luggage based on the travelers' anticipated needs.

SUMMARY

Some of the objects and advantages of the invention will now be set forth in the following description, while other objects and advantages of the invention may be obvious from the description, or may be learned through practice of the invention.

Broadly speaking, a principle object of the present invention is to provide a smart container system comprising a centralized area for charging, storing, and/or using electronic devices.

Another general object of the present invention is to provide a modular smart container system that may be configured by a traveler based on the traveler's anticipated needs.

Still another general object of the present invention is to provide a modular smart container system comprising a plurality of module bays configured for receiving electronic modules with at least one module bay electrically associated with a communication bus and/or a power bus.

A further object of the present invention is to provide a smart container system comprising a communication device configured to receive transportation information from a computer associated with a transportation provider.

Another general object of the invention is to provide a smart container system comprising a vacuum pump configured to be associated with vacuum packs for vacuum packing items.

Additional objects and advantages of the present invention are set forth in the detailed description herein or will be apparent to those skilled in the art upon reviewing the detailed description. Also, it should be further appreciated that modifications and variations to the specifically illustrated, referenced, and discussed steps, or features hereof may be practiced in various uses and embodiments of this invention without departing from the spirit and scope thereof, by virtue of the present reference thereto. Such variations may include, but are not limited to, substitution of equivalent steps, referenced or discussed, and the functional, operational, or positional reversal of various features, steps, parts, or the like. Still further, it is to be understood that different embodiments, as well as different presently preferred embodiments, of this invention may include various combinations or configurations of presently disclosed features or elements, or their equivalents (including combinations of features or parts or configurations thereof not expressly shown in the figures or stated in the detailed description).

It should be noted that for the purposes of this document, traveling means simply to move from one place to another. Reasons for traveling are infinite and include school, hunting, business, and vacation. One example of a container for transporting items while traveling is luggage.

One exemplary embodiment of the present invention relates to novel implementations of electronic technology associated with a container for transporting items while traveling. The smart container comprises at least one module bay configured for receiving a module. The smart container further comprises a controller comprising a processing device associated with a memory. The controller is electrically associated with the module bay and configured for sending and/or receiving data to/from an electronic device associated with the module bay. The controller may be either an integral component of the smart container or a controller module removably received by the smart container.

The smart container further comprises a power source associated with a power bus. The power bus is preferably associated with at least one of (a) a module bay, and (b) the controller. The power source may be a power storage module installed in a module bay wherein the power storage module comprises at least one of (a) power status indicator, (b) a power transfer port configured for at least one of (i) transferring power from said power storage module to an external device; and (ii) transferring power to said power storage module from an external device.

The smart container may further comprise a vacuum pump configured for being associated with a vacuum pack configured for receiving an item to be sealed in the vacuum pack. The vacuum pump is further configured for removing air from the vacuum pack. The vacuum pump may be an integral component of the smart container or an electronic module configured to be received by a module bay.

The electronic modules of the system may be any number of electron devices configured for inserting into a module bay such as: (a) a communication module, (b) a security module, (c) a recording module, (d) an entertainment module, (e) a time module, and (e) a power module. A communication bus may be associated with said controller and at least one module bay for transferring data between the controller and a module installed in said module bay.

A receiver may be associated with the controller allowing the controller to receive signals from an external transmitter. The external transmitter may be a portable transmitter associated with a user or a transmitter associated with a remote information source.

The smart container may be secured by one or more electronic locks operatively associated with said controller and configured for securing the smart container and the smart container modules. The controller is configured to change the status of the electronic locks in response to a signal received from a plurality of sources including an external transmitter, a biosensor, and said processing device.

The smart container may further comprise a transceiver configured for facilitating communications between at least two of (a) an external-electronic-device, (b) said controller, (c) a module installed in said at least one module bay, and (d) an integral electronic device electrically associated with said controller. Examples of such transceiver technology include Bluetooth technology, and Wi-Fi technology.

Yet another exemplary embodiment of the present invention relates to a portable container for transporting items while traveling. The portable container comprises an electronic module associated with a module bay. A user interface, configured for receiving user input, is electrically associated with said controller. The portable container further comprises a communication bus. The communication bus is electrically associated with at least one module bay and the controller. The controller is configured for communicating with said electronic module. The portable container further comprises a power source electrically associated with the controller.

Examples of electronic modules that may be associated with the module bay include the same modules described above. One possible embodiment of a security module is a device comprising a location determination device configured for generating location information relating to the location of the portable container. The controller is configured to retrieve at least part of said location information from said security module in response to a user request and to store monitored-position-location-information (MPLI) in a memory associated with the controller. MPLI information comprises at least part of the location information generated by said location determination device for the portable container's location at the time said user request is received. The controller is further configured to monitor the status of the portable container's location and issue a security-alert when the controller determines that the smart container's location has changed a predefined distance from the location associated with the MPLI. A security-alert may comprise activating various devices associated with the smart container including lights and sound emitters. A security-alert may further transmit a signal to a remote receiver.

The portable container may further comprise a signaling device associated with the controller, said signaling device comprising at least one of (a) a light emitting device, and (2) a sound emitting device. The signaling device may be an integral device electrically associated with said controller or an electronic module. The controller may be configured to activate said signaling device as part of a security alert.

The portable container may further comprise a transceiver operatively associated with said controller with the controller being configured to use said transceiver for transferring data between at least two of (a) the controller, (b) an electronic module, and (c) a portable electronic device associated with a user. The controller may be configured to transmit a data signal to a remote receiver as part of a security alert. Examples of transceivers including: (a) a Bluetooth device, (b) a Wi-Fi device, (c) a cellular phone, (d) a satellite phone. The transceiver may be part of an electronic module installed in a module bay.

The portable container may further comprise a power bus electrically associated with the controller, the module bay, and/or a power port. The power port is suitably configured for connecting to an external electronic device. At least one external surface of said portable container may be associated with an energy conversion device configured to supply power to at least one of (a) said power source, (b) said controller, and (c) a module bay.

Still another embodiment of the invention is an electronic housing configured for use with a portable container used for transporting items while traveling. The electronic housing is releasably associated with a portable container and comprises at least one module bay configured for receiving an electronic module. The electronic housing further comprises a controller comprising a processing device electrically associated with a memory. A power bus electrically associated with a power source may be electrically associated with the controller and module bays.

The electronic housing may further comprise a signaling device that is either an electronic module or an integral electronic device electrically associated with the controller. The signaling device comprises at least one of a light emitting device and a sound emitting device.

The electronic housing may further comprise a user interface electrically associated with the controller and configured for receiving user input. The controller may be further configured to place the signaling device in a signaling mode. The signaling mode can be activated by the controller in response to at least one of (a) user input, (b) data received from an electronic module, and (c) data received from an integral device electrically associated with said controller.

The electronic housing may further comprise a receiver for receiving transmitted signals. For this embodiment, the user input may be a signal transmitted by at least one of (a) a portable transmitter associated with a user, and (b) a remote transmitter associated with a monitoring device.

For one embodiment, the electronic housing is associated with a backpack. At least one external surface of the backpack may be associated with a photovoltaic cell configured for supplying power to at least one of (a) the power source, (b) the controller, (c) an electronic module, and (d) an integral electronic device electrically associated with said controller.

The electronic housing may further comprise a communication bus operatively connected to said controller and a module bay. The communication bus may also be electrically associated with a communication port suitably configured for connecting to an external electronic device or network. Similarly, the power bus may be electrically associated with a power port configured for transferring power to an external device or receiving power from an external device. Internal devices could also be electrically associated with the power port using an external cable.

Another embodiment of the invention relates to electronic devices associated with a book bag used for transporting items while traveling. The book bag comprises an electronic signaling element comprising at least one of (a) a light emitting source and (b) a sound emitting source. The book bag further comprises a user interface electrically configured for receiving user input. A processing device is electrically associated with a memory and said user interface. The book bag further comprises a motion sensor electrically associated with the processing device. The motion sensor is configured for generating motion-data. The processing device is configured to activate the signal device in response to at least one of (a) motion-data, and (b) user input. The book bag further comprises a power source electrically associated with the processing device and the signaling device.

The book bag may further comprise a receiver electrically associated with said processing device, said receiver configured for receiving data signals transmitted from an electronic device. For this configuration, the processing device is configured to activate said electronic signaling element in response to a received-data-signal.

The book bag may further comprise a recording device electrically associated with the processing device. The recording device is configured for generating recorder-data. Examples of recording devices include digital cameras, digital camcorders, and electronic voice recorders. While the preferred recording format is a digital format, analog recording formats may be used. Accordingly, examples of recorder-data include digital pictures and sound data. The processing device is further configured to activate said recording device in response to one of (a) user input and (b) a received transmitted-data-signal.

The book bag may further comprise a transmitter electrically associated with the processing device wherein said transmitter is configured for transmitting a data signal (transmitted-data-signal). The processing device is further configured to transmit a transmitted-data-signal in response to at least one of (a) user input, and (b) a received-data-signal. The transmitted data signal may comprise at least part of the motion-data and/or the recorder-data.

The book bag may further comprise a photovoltaic cell associated with at least one exterior surface of said backpack. Preferably, the photovoltaic cell is a flexible photovoltaic panel. The photovoltaic cell is configured for supplying power to at least one of the power source and at least part of the electronic components associated with the book bag.

A short range transceiver may additionally be associated with the book bag and said processing device. The processing device is further configured to use said transceiver to facilitate data transfers between at least two of (a) an external-electronic-device, (b) said processing device, (d) an integral electronic device. Examples of suitable short range transceivers include Bluetooth technology and Wi-Fi technology.

The book bag may further comprise at least one module bay configured for receiving an electronic module. A communication bus is electrically associated with at least one module bay and the processing device. An electronic module received by a module bay may be electrically associated with the processing device via said communication bus. Similarly, the book bag may comprise a power bus electrically associated with said at least one module bay and said processing device.

The book bag may further comprise a frame comprising a first wheel positioned at a first location on frame and a second wheel positioned at a second location. An extendable handle is associated with the frame and configured to adjustably extend from the frame to a position that allows a user to rest the book bag on said first wheel and said second wheel when moving the book bag. A magnetic device configured for generating power may be further associated with at least one wheel and at least one of (a) said power bus, (b) said signaling device, (c) said power source, and (d) said controller. Alternatively, a magnetic device configured for generating an oscillating magnetic field may be associated with the smart container. One embodiment of a magnetic device configured for generating an oscillating magnetic field is a magnet associated with a rod and configured to slide back and forth across the rod when the smart container is moved. A coil of wire surrounds the rod so that the oscillating magnetic flux lines induce a current in said coil.

Another exemplary embodiment of the present invention concerns methodology for associating electronic devices with a container used for transporting items while traveling. The method includes associating a controller with the container as well as associating a module bay with the container. The controller is electrically associating with the module bay. The controller is configured to receive data from an electronic module electrically associated with said module bay. The controller is further configured to send data to an electronic module electrically associated with said module bay. A power bus is provided wherein said power bus is electrically associated with said module bay and said controller. A power source is electrically associated with the power bus.

Additional embodiments of the present subject matter, not necessarily expressed in this summarized section, may include and incorporate various combinations of aspects of features or parts referenced in the summarized objectives above, and/or features or components as otherwise discussed in this application.

Those of ordinary skill in the art will better appreciate the features and aspects of such embodiments, and others, upon review of the remainder of the specification.

BRIEF DESCRIPTION OF THE DRAWINGS

A full and enabling description of the present subject matter, including the best mode thereof, directed to one of ordinary skill in the art, is set forth in the specification, which makes reference to the appended figures, in which.

Figure 1:
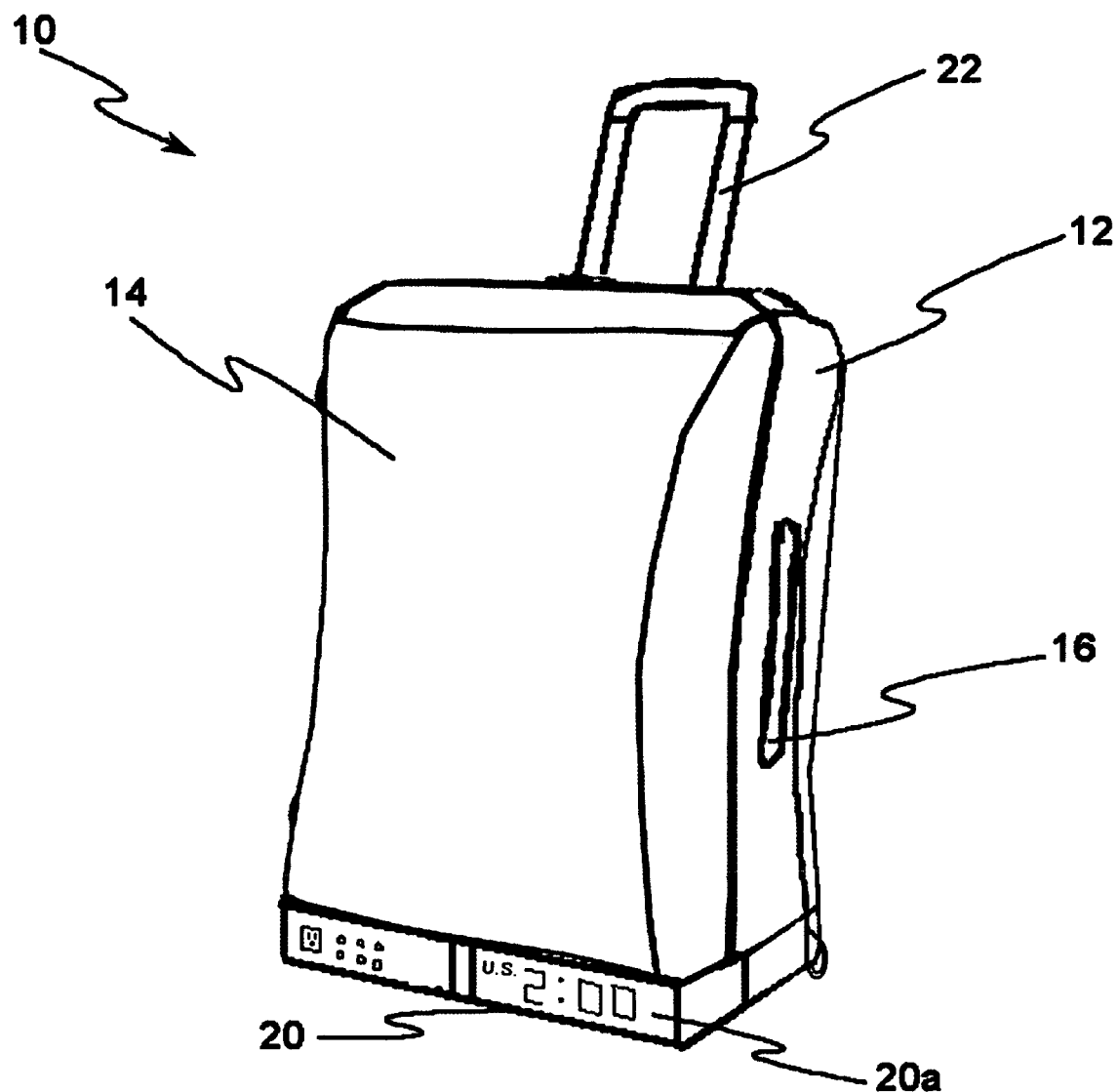
FIG. 1 is a front perspective view of a portable container comprising electronic modules according to one embodiment of the present invention.

Repeat use of reference characters throughout the present specification and appended drawings is intended to represent the same or analogous features or elements of the present technology.

DETAILED DESCRIPTION

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeat use of reference characters is intended to represent same or analogous features, elements or steps. It is to be understood by one of ordinary skill in the art that the present discussion is a description of exemplary embodiments only, and is not intended as limiting the broader aspects of the present invention.

While the particulars of the present invention and associated technology may be adapted for use with any type of container used to transport items while traveling, the examples discussed herein are primarily in the context of travel luggage, hiking backpacks, and book bags.

FIG. 1 is a front perspective view of a smart container (10) comprising electronic modules according to one embodiment of the present invention. It will be appreciated that FIG. 1 is simply for illustration purposes only and the scope of the invention includes embodiments comprising smaller module bays, modules bays inside to a smart container compartment (as described below), embodiments comprising only one module bay as well as embodiments comprising no modules bays with all electronic devices integrated into the portable container.

For the purposes of this document, a smart container is any receptacle for holding items while traveling and associated with electronic devices as described herein. Exemplary smart container (10) includes a compartment for holding items comprising first section (12) and a second section (14). First section (12) is releasably associated with second section (14) so as to form, when closed, a inter void for holding items inside the container. It will be appreciated that the container may be comprised of any number of sections as well as a plurality of compartments for holding items without departing from the scope of the present invention. Additionally, the smart container may comprise only one section configured with a closable hole, for example. One exemplary embodiment of such a container is a duffel bag comprising a string around the perimeter of a hole in one end of the duffel bag.

Figure 2:
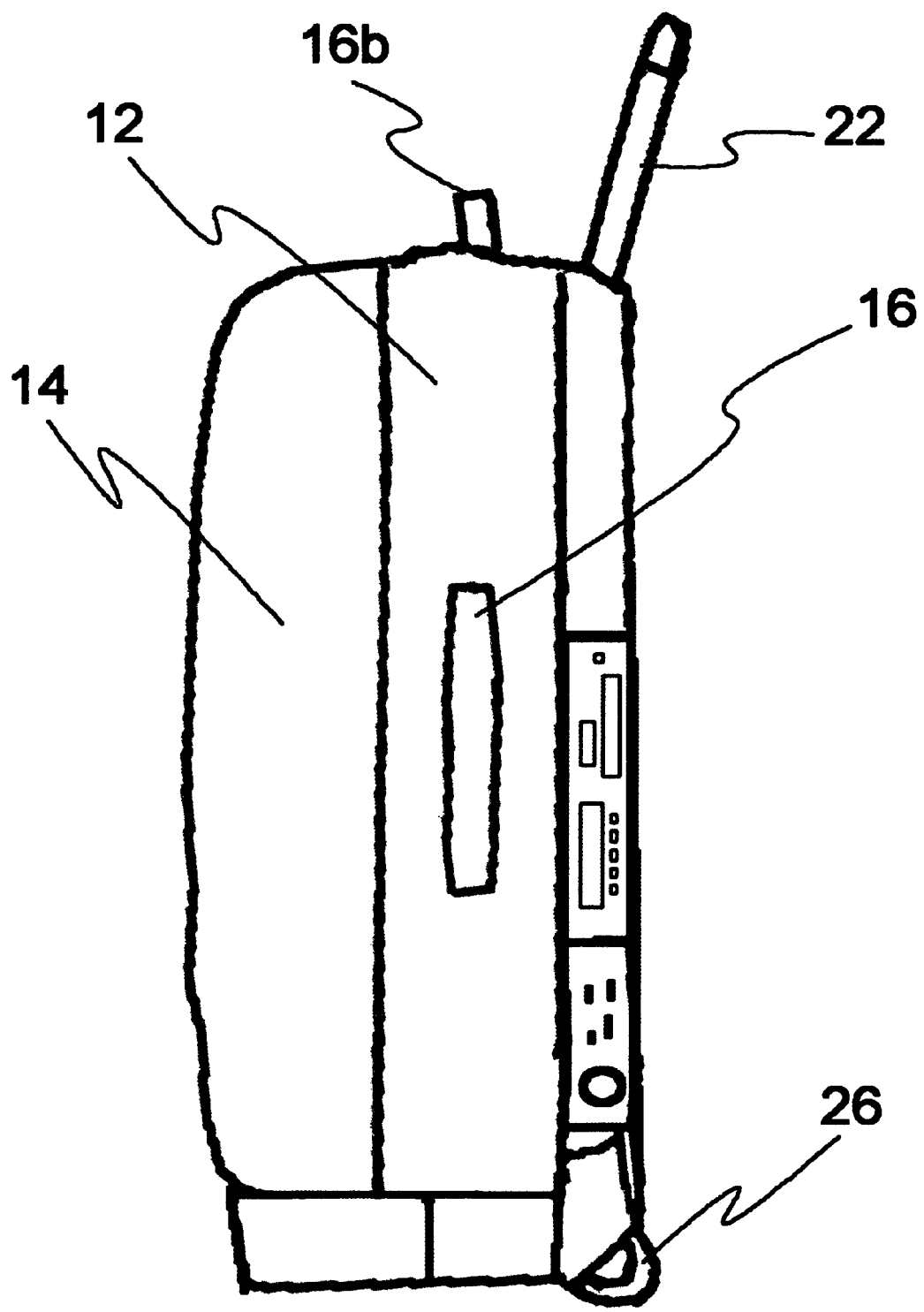
FIG. 2 is a side view of a portable container comprising electronic modules according to one embodiment of the present invention.

Smart container (10) comprise at least one electronic module (20) associated with a module bay (described later). FIG. 2 is a side view of a smart container (10). Handles (16) and (16b) may be used to pick up and/or carry smart container (10).

First section (12) may be releasably associated with second (14) via an electronic lock associated with a processing device. Similarly, each electronic module may comprise an electronic lock for securing the modules. Such electronic locks are electrically associated with a processing device configured for controlling the open/close status of the electronic locks based on user input as well as other control signals. Such technology will be discussed in more detail below.

Figure 3:
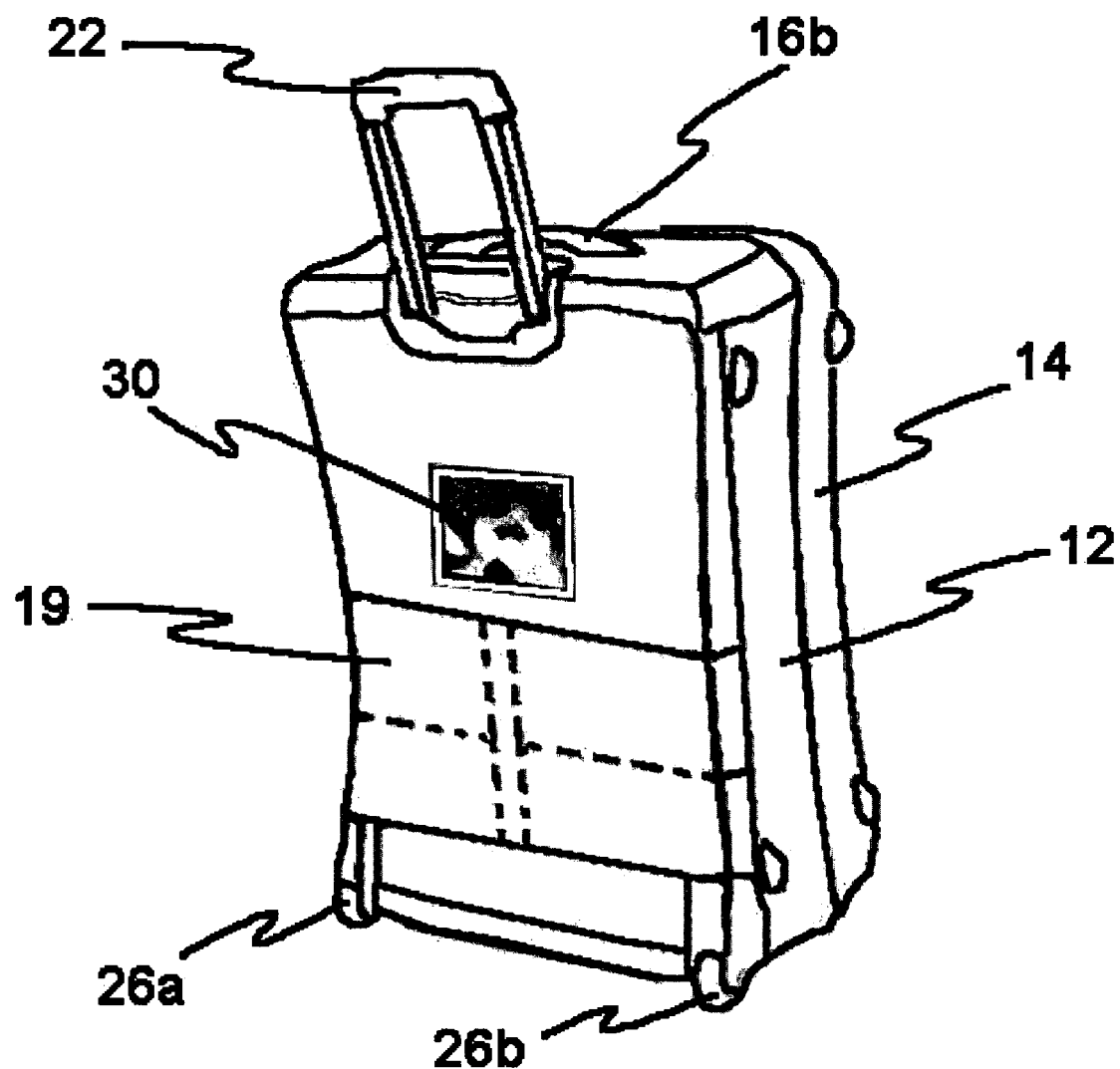
FIG. 3 is a back perspective view of a portable container comprising electronic modules according to one embodiment of the present invention.

FIG. 3 is a perspective view of the back of smart container (10). As shown in FIG. 3, smart container (10) may further comprise a first wheel (26a) and a second wheel (26b). Additionally, the smart container (10) may further comprise an extendable handle (22) associated with the smart container (10) and configured to adjustably extend from smart container (10) to a position that allows a user to rest the smart container (10) on first wheel (26a) and second wheel (26b) when moving smart container (10). One possible embodiment of adjustably extending handle is depicted in U.S. Pat. No. 6,869,086 issued to Sadow and such patent is incorporated by this reference for all purposes.

For embodiments comprising at least one wheel, at least one magnetic device may be associated with such wheel and configured for at least one of: (a) generating energy, and (b) providing a moving force to assist in moving the smart container. For this configuration, the magnetic device may be a generator formed by associating a permanent magnet with a wheel. At least partially surrounding the permanent magnet is a coil of wire. When the wheel is rotated, a rotating magnetic field is generated. The magnetic flux from the rotating magnetic field induces a current in the coil of wire. The coil output is electrically associated with power bus (110) or directly to an electronic device associated with smart container (10). With this configuration, the magnetic device can power an electronic module and/or recharge a power source when the smart container is moving and generating a rotating magnetic field.

Alternatively, a magnetic device may be configured for generating an oscillating magnetic field. One embodiment of a magnetic device configured for generating an oscillating magnetic field is a magnet associated with a rod and configured to slide back and forth across the rod when the smart container is moved. A coil of wire surrounds the rod so that the oscillating magnetic flux lines induce a current in said coil. The output of the coil is electrically associated with power bus (110), an electronic module or integral electronic device.

For yet another embodiment of the invention, the magnetic device may be a motor-generator. A motor-generator is a magnetic device that may be used as either a motor or a generator. For this configuration, the magnetic device is associated with the smart container's (10) power bus (110) via electrical components such as a diode, transistor, etc., so that current only flows in the appropriate direction. When used as a motor, the magnetic device provides a moving force to assist in moving the smart container. Such motor-generator technology is well known and understood by those skilled in the art, and a detailed explanation thereof is not necessary for purposes of describing the method and system according to the present invention.

Figure 4:
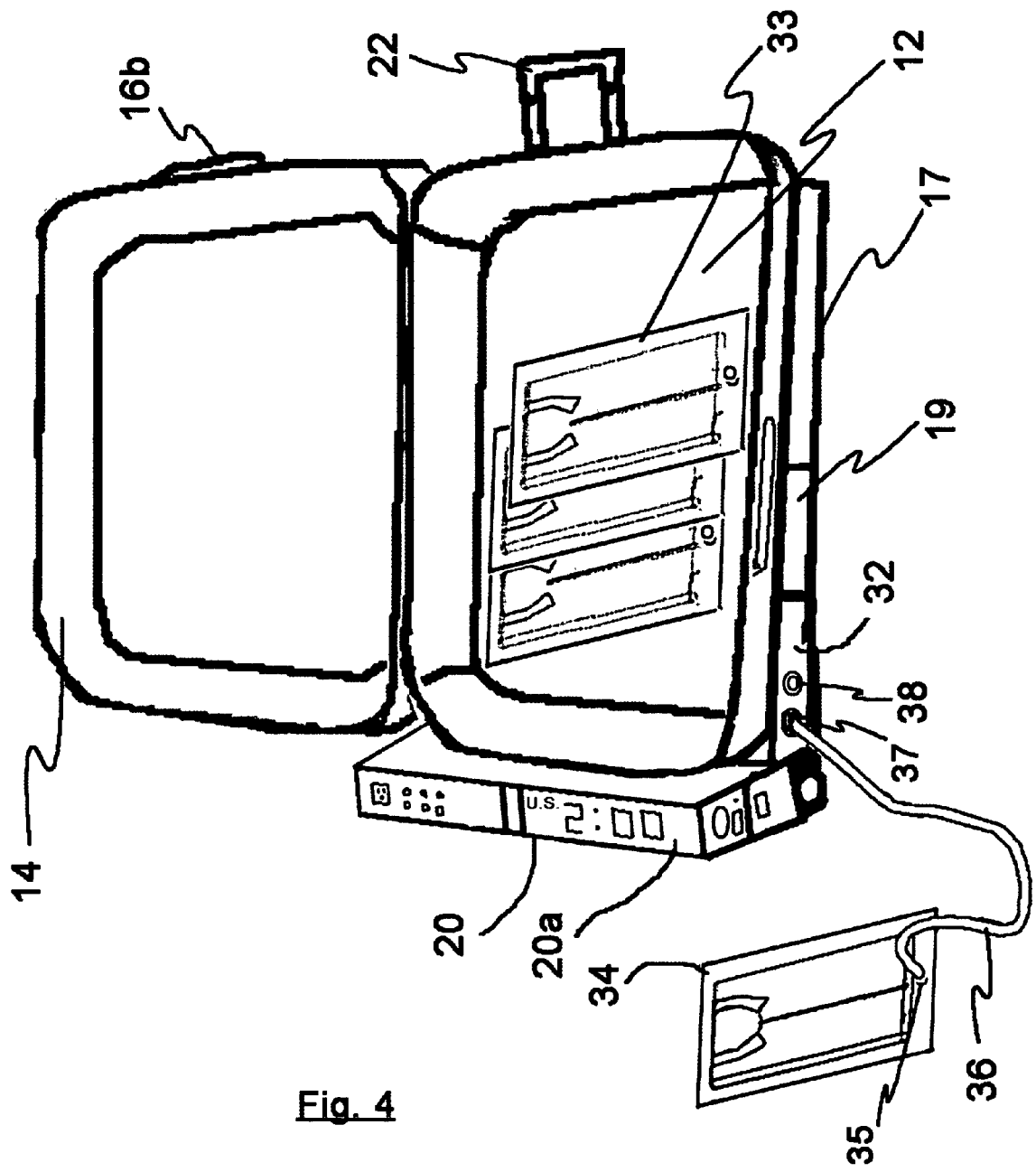
FIG. 4 is a front perspective view of an open portable container connected to a vacuum pump according to one embodiment of the present invention.

FIG. 4 is a front perspective view of smart container (10) where the first section (12) has been partially separated from second section (14) thereby exposing the inter void used to house items. It should be appreciated that while FIG. 1 through FIG. 4 show the electronic modules installed in a housing external to the smart container void, embodiments having at least some electronic module housed inside the smart container void fall within the intended scope of the invention. Similarly, for some embodiments of the invention, the electronic housing may be separated from the smart container. Such a configuration allows the electronic housing to be separated from a first container and associated with a second container. For such embodiments, the electronic housing is associated with a smart container in any number of ways including clamps, straps, and screws.

For the embodiment shown in FIG. 4, the electronic modules are housed in electronic housing (17) associated with smart container (10). Electronic housing (17) comprises at least one module bay (19) configured for receiving electronic modules. Electronic housing (17) is constructed of materials suitable for protecting the electronic modules from the containers anticipated environment. For example, housing (17) may be constructed from rubber armor or other suitable materials with the modules bays configured with vibration damping technology such as rubber mounts or springs. Additionally, the module bays may be configured to receive a removable cover for protecting the outermost surface of a module. For example, a removable cover (not shown) may be installed over outer surface (20a) of electronic module (20). Preferably, such removable cover would be transparent.

The FIG. 4 embodiment of smart container (10) includes vacuum pump (32). Vacuum pump (32) may be integral to smart container (10) or vacuum pump (32) may be an electronic module installed in a module bay. Vacuum pump (32) sucks air in input-port (37) and exhaust air out output-port (38). The input-port (37) of vacuum pump (32) is associated with vacuum pack (34) by attaching hose (36) to connector (35). For this configuration, connector (35) is a one way check valve that allows air to exit vacuum pack (34) while preventing air from entering vacuum pack (34) when hose (36) is removed. When activated, vacuum pump (32) will vacate the air from vacuum pack (34) thereby vacuum sealing the clothing item housed by vacuum pack (34). Hose (36) may be of any suitable design and is preferably configured to releasably attach to connector (35). Additional vacuum packs (33) are shown inside the inter void of first section (12) of smart container (10).

Vacuum pack (34) may be of any suitable design appropriate for sealing items including clothing items and food items. Such vacuum pack technology is well known in the art and suitable vacuum pack designs are disclosed in U.S. Pat. No. 5,954,196 issued to Lin and U.S. Pat. No. 5,761,992 issued to Gallo and such patents are incorporated by this reference for all purposes.

Additionally, the smart container may further comprise a removable pack that is configurable as both a vacuum pack and an inflatable pack. For this embodiment of the invention, vacuum pack (34) may be configured to inflate and serve, for example, as an air pillow. Connector (35) is a reversible connector that allows air flow in only one direction, either into the removable pack or out of the removable pack, depending on the connector (35) configuration. Connector (35) of vacuum pack (34) (a removable pack) is connected to output-port (38) of vacuum pump (32) by associating one end of hose (36) to connector (35) and the opposite end of hose (36) to output-port (38) of vacuum pump (32). When activated, vacuum pump (32) becomes an air pump that inflates vacuum pack (34) into a predefined shape, such as the shape of a typical pillow. The outer surface of vacuum pack (34) may be covered with a lining comfortable to the touch.

One possible embodiment of a reversible connector (35) is a connector comprising a check valve that is housed in a detachable housing. The detachable check valve is inserted into connector (35) in a manner that allows air flow in the desired direction and blocks airflow in the opposite direction. Yet another embodiment of a removable pack that may be either inflated or vacuum sealed comprises two check valves; an input check valve (allows air in but not out) and an output check valve (allows air out but not in). One such valve would be disabled depending on the application of interest. For example, when used to vacuum seal an item inside vacuum pack (34) the input check valve would be disabled.

Power for vacuum pump (32) may be supplied from a power source integral to smart container (10). Alternatively, vacuum pump (32) may comprise a power connection for connecting vacuum pump (32) to an external power source.

Figure 5:
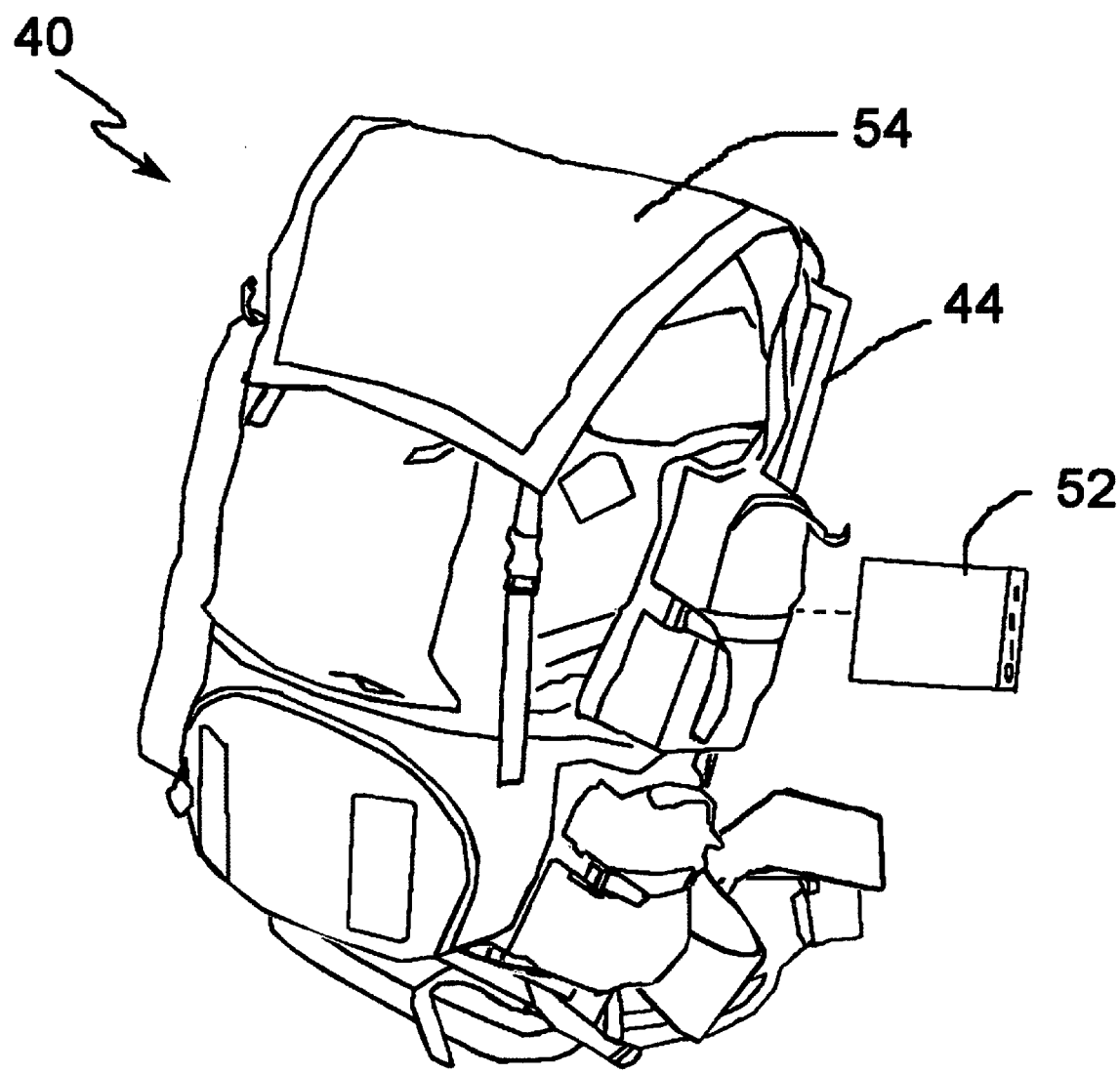
FIG. 5 is a front view of a portable system comprising an electronic housing configured for association with a portable container according to one embodiment of the present invention.
Figure 6:
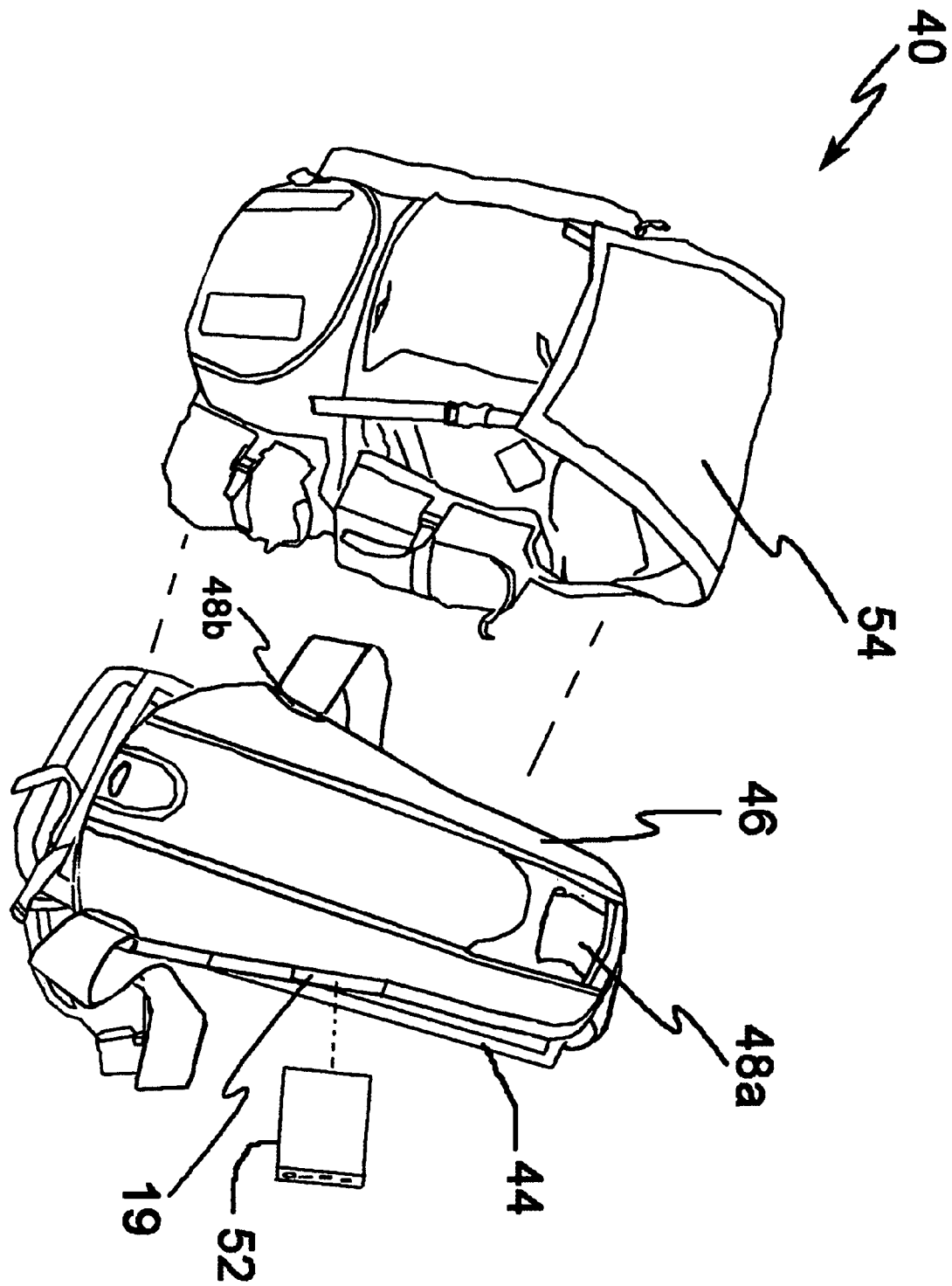
FIG. 6 is an exploded perspective view of a portable system depicted in FIG. 5.
Figure 7:
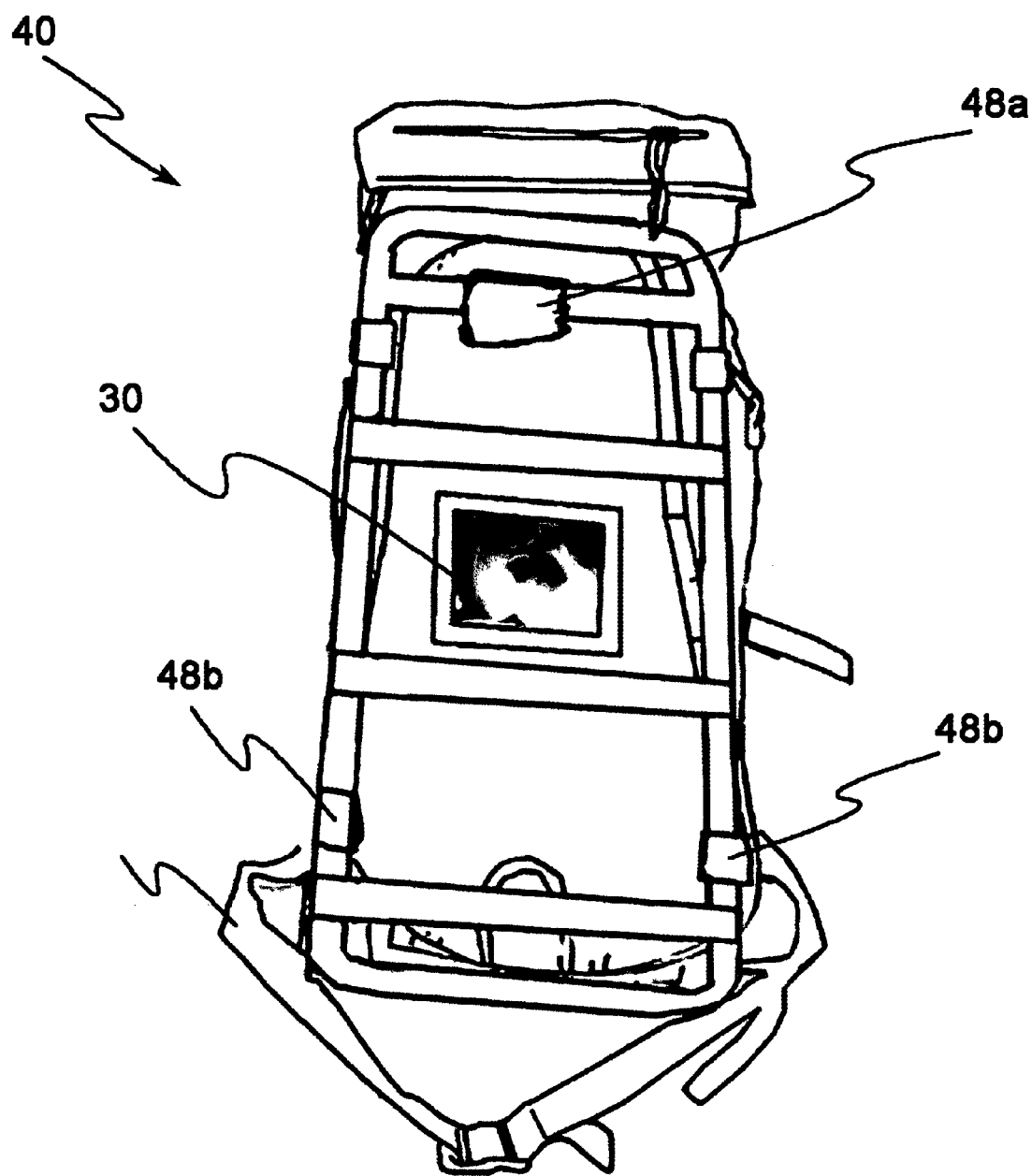
FIG. 7 is a back view of a portable system comprising an electronic housing according to one embodiment of the present invention.

Yet another embodiment of the invention is shown in FIG. 5 depicting a front view of a portable system (40) comprising an electronic housing (46) (shown in FIG. 6) configured to be associated with a portable container for holding items while traveling. FIG. 7 provides a back view of a portable system (40) associated with electronic housing (46). For the exemplary embodiment shown in FIG. 5, the container is a backpack typically carried by hikers. FIG. 6 is an exploded view of portable system (40) shown in FIG. 5. As better shown in FIG. 6, electronic housing (46) comprises at least one module bay (19) configured for receiving an electronic module (52). Electronic housing (46) further comprises a controller (not shown) electrically associated with electronic module (52). Additionally, electronic housing (46) further comprises a power source associated with the controller and the module bay (described in detail later).

One possible power source is an energy converter associated an exterior surface of the container, such as top flap (54). For this configuration, the energy converter may be a flexible photovoltaic device comprising at least one photovoltaic cell and preferably constructed from plastics or other durable materials known in the art. The photovoltaic device may be a panel that is associated with top flap (54) or top flap (54) may be formed using photovoltaic thread. One suitable photovoltaic technology is PowerFilm® manufactured by Iowa Thin Film Technologies. The electronic attributes of electronic housing (46) will be discussed in detail later in this document.

As can be seen in FIG. 6, electronic housing (46) is configured to associate with external frame (44). As is well known, external frame backpacks have a fully exposed external frame designed for receiving a backpack. For this embodiment of the invention, electronic housing (46) is configured to attach to external frame (44) by straps (48a) and (48b). Additionally, straps (48a) and (48b) may also be used to secure the backpack to the frame thereby securing the electronic housing (46) between the backpack and the external frame (44) as shown in FIG. 5-FIG. 7.

It should be appreciated that external frames (such as external frame (44)) are typically made of aluminum or other light weight materials. Such frames are substantially rigid with permanent, non-flexible attachment points. Such frames are known to work against the natural body movement of a hiker and have a tendency to tire a hiker quicker that flexible backpack designs. For one embodiment of the invention, electronic housing (46) also doubles as a flexible external frame thereby eliminating the need for external frame (44). For this embodiment, the electronic housing (46) is substantially constructed from light weight plastic materials (or other flexible or rigid materials) that provide a generally more flexible light weight designed compared to typical external frame systems. Such a frame better moves with the natural motion of the body carrying the portable system (40).

For yet another embodiment of electronic housing (46), such housing is configured to be housed inside the container (e.g. a backpack) thereby providing a flexible or rigid, comfortable internal frame design. For this configuration, the backpack may comprise ports allowing access electronic modules associated with electronic housing (46). There internal frame configuration provides added protection to the electronic housing (46) from environmental phenomenon such as rain.

Figure 8:
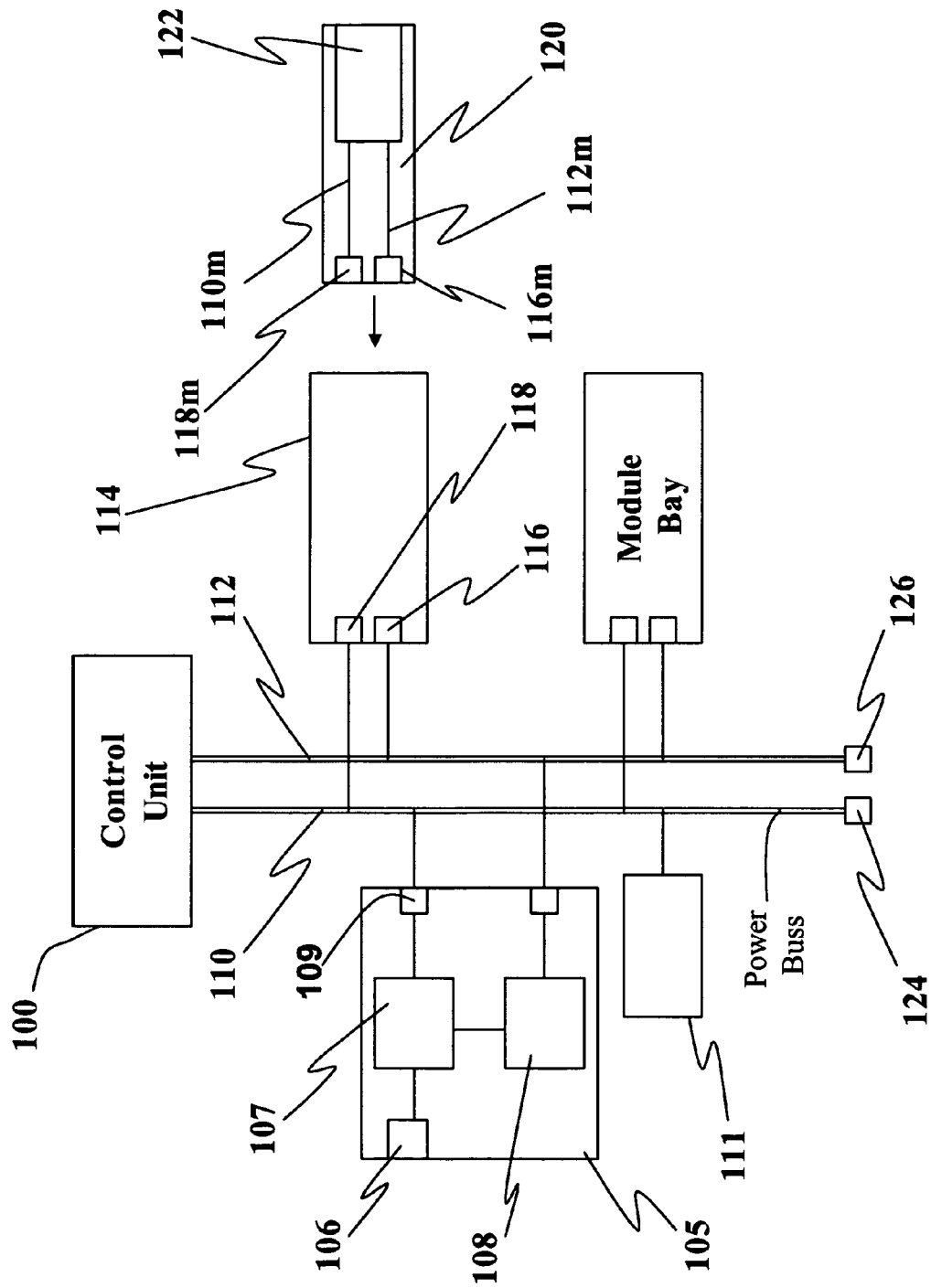
FIG. 8 is a block diagram representation of the electronic components for one embodiment of the present invention showing a plurality of module bays associated with a control unit.

Attention now is turned more particularly to the electronic attributes of the invention. Referring now to FIG. 8, a block diagram representation of one possible configuration for the electronic components of the smart container system is depicted. FIG. 8 shows a control unit (100) electrically associated with at least one module bay (114). For this embodiment of the invention, control unit (100) is electrically associated with module bay (114) through a communication bus (112) via communication connector (116). Similarly, module bay (114) is electrically associated with power bus (110) via power connector (118). Preferably, both communication connector (116) and power connector (118) are keyed connectors that associated the communication bus (112) and the power bus (110) to a module bay in a predefined configuration. Additionally, while FIG. 8 depicts control unit (100) as an integral component of the smart container, it will be appreciated that for other embodiments of the invention control unit (100) may be a module electrically associated with a module bay.

For the purposes of this document, two items are "electrically associated" by bringing them together or into relationship with each other in any number of ways. For example, two electronic items/components may be electrically associated in numerous ways including: (a) a direct, indirect or inductive communication connection, and (b) a direct/indirect or inductive power connection. Additionally, while the drawings illustrate various components of the system connected by a single line, it will be appreciated that such lines represent one or more connections or cables as required by the smart container embodiment of interest.

Power bus (110) comprises a ground connection (or a plurality of ground connections) and at least one power connection and is configured for distributing power to electronic components of the system. Alternatively, a ground connection may be provided by a common connection such as an electrically conductive frame associated with the electronic components of the system. For the embodiment shown in FIG. 8, power bus (110) is electrically associated with portable power source (111). Power source (111) may be an integral component of the smart container as shown in FIG. 8 or it may be a module configured to be electrically associated with a module bay. For the embodiment shown in FIG. 8, power source (111) comprises at least one battery configured for supplying a direct current (DC) voltage. It will be appreciated that power source (111) may comprise a plurality of batteries supplying a single output voltage or a plurality of output voltages without departing from the scope of the invention.

Additionally, a power module (105) may be electrically associated with a module bay. For this configuration, the power module (105) comprises a power port (106) configured for connecting to an external power source. Power module (105) may further comprise a converter (107) for converting an input voltage to a form compatible with the system components. Power module (105) may provide a single output voltage or a plurality of DC output voltages. For example, converter (107) may be configured to provide a device specific output as well as common DC output voltages including 3.3 volts, 5.0 volts, 12 volts, 24 volts, and 48 volts. Similarly, power module (105) may further comprise an inverter for generating an alternating current (AC) output voltage as well as AC output frequency. Such converter technology is well known and understood by those skilled in the art, and a detailed explanation thereof is not necessary for purposes of describing the method and system according to the present invention.

As noted above, the output of power module (105) is electrically associated with power bus (110) via power connector (109). Power connector (109) is preferably a keyed power connector comprising at least one ground connection and at least one power connector. For example, one embodiment of power bus (110) may be configured to receive six different output voltages. For this embodiment, power bus (110) comprises twelve conductors or six ground/power conductor pairs. Alternatively, fewer ground conductors may be used including a signal common ground conductor. Keyed power connector (118) is a female connector configured to receive a keyed male connector associated with an electronic module. When power bus (110) is associated with power module (105), the power module's keyed power connector (109) associates the output voltages of power module to power bus (110) in a predefined configuration. This allows an electronic module comprising an appropriately configured power connector to access the appropriated power connections when installed in a module bay.

Alternatively, converter (107) may be a programmable converter providing a range of output voltage levels. For this embodiment of the invention, the output of converter (107) is controlled by control unit (100) by issuing commands over communication bus (112). One example of such programmable converter technology is disclosed in U.S. Pat. No. 6,903,950 issued to Afzal et al. which is incorporated by this reference for all purposes.

Preferably, power module (105) further comprises power status monitor (108) configured to provide power status data.

Such power status data may be provided to a display device integral to power module (105) and/or to control unit (100) via communication bus (112). Display configurations include analog visual indicators, digital numerical displays, graphic displays, and video displays.

Figure 9:
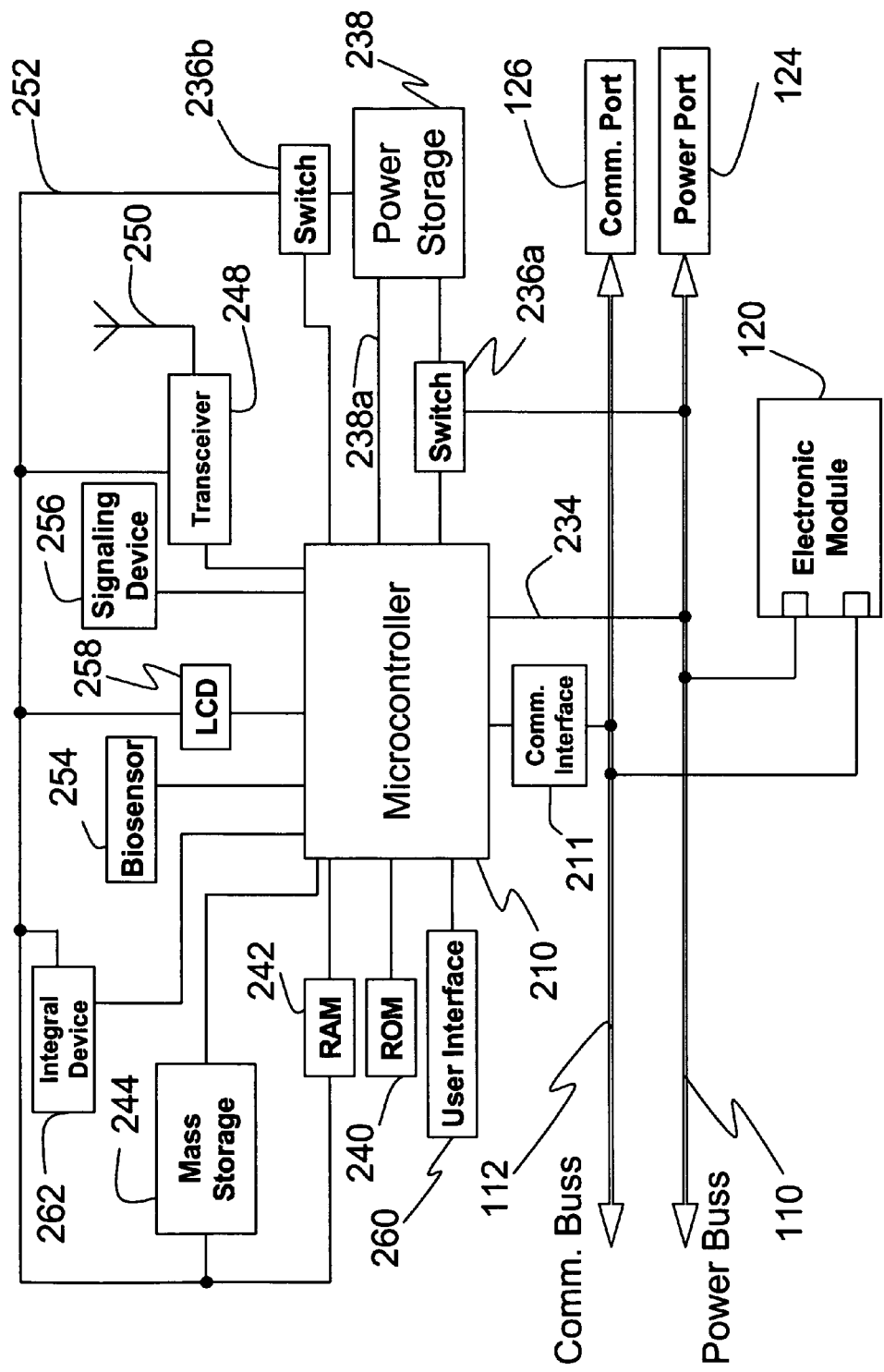
FIG. 9 is a block diagram representation of the electronic components for one embodiment of the present invention depicting a controller associated with a communication bus and a power bus, an electronic module and integral electronic devices.

Communication bus (112) is now considered. As described above, the smart container may comprise a plurality of electronic modules. Such electronic modules may be electrically associated with a communication bus for facilitating inter-module communication as well as communication with control unit (100) (FIG. 8) or microcontroller (210) (FIG. 9). Such electronic modules may comprise various technologies performing a multitude of functions. Accordingly, it should be appreciated that communication bus (112) may comprise different technologies depending on the smart container configuration. For example, some smart container embodiments may have little need to exchange information with other processing devices located either near or far, while other configurations may need to send and receive information over distances large and small via wires or through the air.

For the purposes of this document, a communication bus is a communication path or link that conveys information such as data, commands, and addresses, or all three in sequence or any combination thereof to a plurality of devices. The communication path may be a wired or wireless communication path comprising a plurality of wires or a single path such as a fiber optic link.

To fully leverage the capabilities of a smart container system comprising multiple electronic modules and devices, a smart container "networking" scheme is used for the preferred embodiment. As is well known, communication systems minimally require a transmitter (wired or wireless) to send information, a receiver to receive the information, and a link between the two. Communication bus (112) is such a link between the control unit (100) and one or more electronic modules (120) and is part of a "networking scheme" for networking the various electronic devices associated with the smart container Communication bus (112) may be configured with multiple conductors such as a three conductor system comprising a ground conductor, power conductor, and data conductor over which serial communications is conducted. Similarly, communication bus (112) may comprise more advanced technologies such as a Universal Serial Bus (USB) or Ethernet. Indeed, some configurations of the invention may comprise two or more communication buses.

For the embodiment of the invention illustrated in FIG. 8, communication bus (112) is an Ethernet bus electrically associated with control unit (100) and at least one module bay. Communication bus (112) is configured for transferring data using at least one of IP or UDP communication protocols. The system is designed to facilitate resource sharing and information exchange between electronic components associated with the smart container. Communication bus (112) may comprise communication port (126) for connecting the smart container to an external network such as the Internet or an external computing device. With such connection to the outside world, many features become available including software upgrades, BIOS updates, and data sharing.

For the preferred embodiment, electronic modules are hot-pluggable and automatically announce their presence and capabilities to other devices and configure themselves when connected to the network saving the user from reading installation instructions and configuring network addresses and drivers.

Yet another possible communication architecture that may be used by the smart container is Home Audio Video Interoperability (HAVi) architecture using an API (Application Programming Interface). For this configuration, the communication bus (112) complies with IEEE 1394 wiring (Firewire). Such HAVi technology is disclosed in U.S. Pat. No. 6,829,656 issued to Szucs et al. which is incorporated by this reference for all purposes.

Referring now to FIG. 9, a block diagram representation of one embodiment of control unit (100) associated with communication bus (112) and power bus (110) is depicted. Control unit (100) comprises a processing device associated with a memory. Examples of suitable controllers included personal computers as well as controllers comprising processing devices, such as microcontrollers associated with a memory and I/O interfaces. For the embodiment illustrated in FIG. 9, control unit (100) comprises microcontroller (210) associated with RAM memory (242) and ROM memory (240). ROM memory (240) is used to store system-level programs such as BIOS or other types of data that rarely change, if ever. RAM memory (242) is used to store data that may change frequently. Such data includes system data generated by microcontroller (210), data received from an electronic module electrically associated with microcontroller (210), or data received from an external device. It will be appreciated that other memory technologies may be used in place of ROM memory (240) and RAM memory (242) including PROM, EPROM or EEPROM.

Microcontroller (210) may be further associated a mass storage device such as mass storage (244). One example of a mass storage device is a magnetic/optical hard drive. Mass storage (244) may be used to store any data but is particularly suitable for storing large data files such as image files and sound files.

The smart container may further comprise a display device electrically associated with microcontroller (210). A Liquid Crystal Display (LCD) is one possible display device that may be used for displaying information to a user. While an electronic display is preferred, mechanical displays may be used without departing from the scope of the invention. For the preferred embodiment of the invention, LCD (258) is configured for displaying information to a user. LCD (258) may be further configured with touch screen technology thereby providing a user interface by which a user can input data into the system. Alternatively, user interface (260) may be electrically associated with controller (210) and may comprise various technologies including: (a) a single button, (b) a keypad, and (c) an auditory interface such as the ones used by the permanently blind.

Control unit (100) may further comprise technology configured for wireless communications such as a receiver, a transmitter, and/or a transceiver. For the embodiment of the invention shown in FIG. 9, microcontroller (210) is electrically associated with transceiver (248). Transceiver (248) is further associated with antenna (250). Preferably, the transceiver is configured for facilitating communications between two electronic devices. Examples of such transceiver technology include Bluetooth technology, and Wi-Fi technology. For example, control unit (100) might use transceiver (250) to transmit music data generated by an electronic module playing a MP3 file to a blue-tooth enabled headset associated with a user.

Some embodiments of a smart container may comprise a signaling device for providing a signaling function and/or an entertainment function. For this configuration, signaling device (256) is electrically associated with microcontroller (210) and comprises at least one of a light emitting element and a sound emitting element. For configurations including lights, such lights are preferably positioned around the perimeter of the smart container. For example, a user may carry a portable transmitter, such as a key chain transmitter that comprises a "lights button," that when pressed, transmits a signal that is received by transceiver (250). Such a received signal may instruct controller (210) to activate signaling device (256) in a predefined pattern thereby making the smart container easier to locate. For the purposes of this document, a predefined pattern may be a random pattern. Similarly, in response to user input, microcontroller (210) may be further configured to use transceiver (250) to transmit a signal to the portable transmitter instructing it to activate a light associated with the key chain transmitter (or to emit a sound) to assist in locating the key chain transmitter.

Control unit (100) and/or the smart container may further comprise an integral power storage device such as power storage device (238). Power storage device (238) is electrically associated with the microcontroller (210) and/or power bus (110). One possible power storage device is a battery or an array of batteries. Preferably, power storage device (238) is a backup power source that keeps the microcontroller (210) and selected components active when power bus (110) is not associated with a power source. For the embodiment of the invention shown in FIG. 9, microcontroller (210) is electrically associated with power storage device (238) through conductor (238a). Conductor (238a) may comprise a plurality of conductors that provide for power transfer as well as monitoring functions.

Power storage device (238) may be further electrically associated with power bus (110) through a switched connection. For such an embodiment, microcontroller (210) is electrically associated with the control input of power switch (236a). Power storage device (238) is electrically associated with one side of power switch (236a) and power bus (110) is electrically associated with the other side of power switch (236a). It will be appreciated that the electrical connections associating microcontroller (210), power storage device (238), and power bus (110) may comprise a single conductor or a plurality of conductors. Similarly, power switch (236a) represents at least one mechanical or electronic switch having a single switch with one pole, a single switch with a plurality of poles, or and plurality of switches. Additionally, power switch (236a) may be bidirectional switch or unidirectional switch or a combination of the two.

Microcontroller (210) may be further configured to monitor the status of power storage device (238) and actuate power switch (236a) when it has determined that the power storage device (238) needs recharging. Similarly, microcontroller (210) may actuate power switch (236a) so that power storage device (238) supplies power to an electronic module associated with power bus (110).

Power storage device (238) may be further associated with other electronic components integral to the container such as RAM memory (242), mass storage (244), LCD (258), and integral device (262). For this embodiment, power storage device (238) is electrically associated with selected components of the system through switch (236b) and connection (252). Microcontroller (210) is electrically associated with control input of switch (236b). Power storage device (238) is electrically associated with one side of switch (236b) and selected components of the system are electrically associated with the other side of switch (236b) through connection (252). As before, it will be appreciated that the electrical connections associating microcontroller (210), power storage device (238), and selected components of the system together may comprise a single conductor or a plurality of conductors. Similarly, switch (236b) represents at least one mechanical or electronic switch comprising a single switch with one pole, a single switch with a plurality of poles, or and plurality of switches. With this configuration, microcontroller (210) may perform numerous power functions such as a controlled shutdown. For example, when no functional power source is associated with power bus (110) and the power storage device (236b) is depleting its power, microcontroller (210) may determine that mass storage (244) and transceiver (250) are not currently required and turn off power to such systems to conserve power.

Microcontroller (210) may further be associated with a biosensor (254) configured for providing identification data used in an automated identification system. Biosensor (254) is configured for sampling various features associated with a user such as facial features, fingerprints, hand geometry, handwriting, iris, retinal, vein, and voice. For this embodiment, microcontroller (210) takes a baseline electrical interpretation of a biosample for a user attribute using biosensor (254) and stores biodata (or identification data) in a memory associated with microcontroller (210). When a user wishes to access the container or system components, the microcontroller (210) requests a bioreading from the user and compares the newly sampled biodata with the stored identification data. If the microcontroller (210) determines that the two biosamples are from the same person, the microcontroller (210) performs a desired function, such as unlocking an electronic lock associated with the smart container or releasing an electronic module.

Attention is now directed to the electronic devices that may be electrically associated with a smart container. Electronic devices may be integral components of the smart container or they may be incorporated into electronic modules configured to be received by a module bay. That being said, it should be appreciated that electronic devices described below as modules in one configuration may integrated into the smart container system as an integral device in a different configuration. Similarly, electronic devices described below as integral devices may be integrated into electronic modules. Additionally, the features of two or more modules may be incorporated into one module or integral device.

One example of an integral device is an electronic lock configured to secure the smart container. For this embodiment of the invention, microcontroller (210) controls the status of the electronic lock. Upon receiving user input from a user interface, program routine, a remote transmitter or biosensor (234), etc., microcontroller (210) changes the status of the electronic lock accordingly. For example, as noted above, a user may transmit a signal to the smart container using a portable transmitter associated with a key chain having, for example, a "light" and a "unlock" button. When the user presses the "unlock" button within range of the transceiver (250), microcontroller (210) receives the unlock signal and unlocks the electronic lock. Such electronic lock technology is well known and understood by those skilled in the art, and a detailed explanation thereof is not necessary for purposes of describing the method and system according to the present invention.

One example of program routine that instructs microcontroller (210) to cycle the electronic lock includes a program routine executed by microcontroller (210) (or other processing devices such as an ASIC, Application Specific Integrated Circuit) that monitors the smart container for movement for a predefined period of time using a motion sensor associated with the smart container. If the microcontroller (210) detects movement for ten minutes (for example) the microcontroller (210) will conclude the smart container is in transient and should be locked. Microcontroller (210) then checks the status of the electronic lock, and if it is not locked, microcontroller (210) generates a lock signal that is transferred to the electronic lock thereby locking the electronic lock and securing smart container (10).

Microcontroller (210) may be further configured to use such motion sensors for other purposes such as monitoring the portable container environment for movement. For this embodiment, microcontroller (210) is associated with a motion sensor through either a wired or wireless link. The motion sensor may be an integral electronic device or an electronic module configured with a transmitter (such as Bluetooth) that may be removed from the container and placed at a strategic location near the smart container. When the motion sensor detects motion, it generates motion-data that is transferred to microcontroller (210). In response to the motion-data, microcontroller (210) may perform any number of predefined functions including: (a) activating a signaling device, (b) activating a recording device, and (c) transmitting a data signal. The transmitted data signal may comprise any container data linked to microcontroller (210). For example, hikers may find such a configuration useful when leaving campsites and backpacks unattended while they go exploring. Such hikers would preferably carry an electronic device comprising a receiver, such as a PDA, watch, etc., that is configured to received the transmitted data-signal.

Similarly, any number of sensors may be associated with microcontroller (210) and used to monitor various attributes of the smart container. For example, a magnetic sensor (such as the well known magnetic sensors used in security systems) may be associated with the smart container that detects when the smart container is opened. Microcontroller (210) monitors the sensor and generates system-data describing, for example, when the container was opened, how long the container was opened and where it was opened (for configurations that comprise a location determination module). For configurations associated with a recording module (descried below), the microcontroller (210) may further record image data and/or sound data. Other sensors include, temperature sensors, acceleration sensors, hygrometers, altimeters, weight, light, current, voltage, magnetic field sensors, or any device that may be electrically associated with microcontroller (210) and configured to provide information about the smart container's environment.

Another integral device that may be associated with microcontroller (210) is a transmitter configured to transmit a relatively high power signal compared to transceiver (248). Preferably, such a transmitter may be used to transmit system-data to a remote receiver at least one mile from the smart container. Additionally, such a transmitter may be configured for a specific purpose such as transmitting a distress signal. One embodiment of such at transmitter comprises a device that transmits a signal at 406 MHz, a frequency monitored by Search and Rescue (SAR). The signal transmitted may be a personalized, coded signal that uniquely identifies a user and tells SAR who the user is, where the user is, and that the user is in a life-threatening situation.

Alternatively, some situations may not warrant transmitting a SOS signal. For such situations, the microcontroller may be configured to transmit a data signal to an electronic device comprising a receiver. Again using the example of a hiker exploring the area around his/her campsite, such a hiker may become lost or simply "turned around." The hiker uses a portable electronic device comprising a transmitter (watch, PDA, cellular phone, etc.) and transmits a signal to smart container (10). In response to the received signal, microcontroller (210) may perform any number of functions including transmitting the container's location data to the hiker, transmitting a signal to a remote receiver associated with a third party or monitoring station, and activating a signaling device associated with smart container (10).

Attention now is direction to the various electronic modules that may be electrically associated with a module bay. Examples of electronic modules include: (a) a communication module, (b) a security module, (c) a recording module, (d) an entertainment module, (e) a clock module, (f) location module, (g) a display module, and (h) a power module.

It will be appreciated that any number of electronic devices may be integrated into the smart container system without departing from the scope and spirit of the invention. The electronic modules described below are presented by way of example and the smart container system may comprise a plurality of physically separated but cooperatively associated electronic devices comprising electronic components that are not shown independently such as communication interfaces, transmitters, receivers, processors, one or more display means, a magnetic card reader, bioscanner, audio speakers, sensors, and the like, each preferably communicating with or under control of the microcontroller (210) or another electronic module. As noted above, for the preferred embodiment, electronic modules are hot-pluggable and automatically announce their presence and capabilities to other system modules and integral devices and configure themselves when connected to the smart container. Additionally, module features of two or more electronic modules may be condensed into a single module without departing from the scope of the invention. For example, the features of a recording module, location module, and communication module may be comprised in a single module or even a single integral electronic device.

A communication module is a module configured for transferring data between the smart container and external electronic devices. The communication module may comprise a wired port for connecting a data cable between the smart container and an information source (such as the internet). Preferably, the communication module comprises at least one transmitter/receiver, or transceiver, based on technology such as Bluetooth, Wi-Fi, cellular phones and satellite phones. For the preferred embodiment, the communication module comprises cellular phone technology housed in typical cell phone housing (122) (block diagram representation shown in FIG. 8) that is inserted into a module housing (120) and releasably received thereby. The module housing is then inserted into a module bay (114). The cellular phone is configured with a communication port that is electrically associated with a module communication interface when the communication module is associated with the module housing (120). The module communication interface is electrically associated with communication bus (112) thereby electrically associating the communication module with microcontroller (210) and other appropriately configured electronic modules. Preferably, the cellular phone comprises a power source housed in the cell phone housing which is electrically associated with power bus (110) via a power connector (118$m$).

Next one possible security module configuration is considered. The security module is configured to monitor the smart container system and/or a user associated with the smart container system. A security module may comprise any combination of features including: a sound emitter, light emitter, electronic sensors, image and sound recording devices, and a removable stun gun. The security module is electrically associated with microcontroller (210) through communication bus (112) and preferably comprises its own power source which may be electrically associated with power bus (110). The security module may further comprise a processing device that monitors at least one of (a) a user and (b) the smart container. Alternatively, the security module may simply be a signaling device that activates a strobe light and horn (for example) upon receiving an activation signal from microcontroller (210).

One possible embodiment of a recording module is now considered. The recording module comprises various technologies for recording at least one of images and sound. For the preferred embodiment, the recording module comprises a commercially available digital camcorder housed in a camcorder housing associated with a battery. The digital camcorder is received by a module housing (120) configured for releasably receiving the camcorder. The module housing is inserted into module bay (114) thereby electrically associating the camcorder with at least one of communication bus (112) and power bus (110). Typical camcorder outputs include firewire and USB. Depending on the communication bus (112) configuration and the camcorder output port configuration, the camcorder output may be directly associated with communication bus (112) or it may be electrically associated with a module communication interface which is electrically associated with communication bus (112). Preferably, the camcorder may be removed from the smart container so that a user may record images and sound as desired. Additionally, when associated with module housing (120) and installed in the smart container system, the camcorder is configured so that it may record images/sound of the smart container's environment upon receiving a record signal from microcontroller (210). The record signal may be transmitted over communication bus (112) or via a wireless signal (for Bluetooth enable camcorders). Additionally, microcontroller (210) may be configured to retrieve image and sound data from the recording module and store such data in mass storage (244) or transmit such image and sound data to a remote location.

Another embodiment of a recording module comprises a plurality of digital cameras associated with the smart container so that at least one digital camera is associated with a plurality of outside surfaces such as the top surface, the side surfaces, and the bottom surface. For the preferred embodiment of the invention, the microcontroller (210) is configurable to control the digital cameras and record images upon a local user request or a remote request such as a remote request transmitted from a distant transmitter. For one embodiment of the invention, at least one digital camera is a fully contained system comprising its own power source and is preferably releasably associated with the smart container allowing a user to remove said camera and record images as desired. When the camera module is reinserted into a module bay associated with the smart container, microcontroller (210) may be further configured to transfer recorded images from the digital camera to mass storage (244) or to transmit such images to a remote computer.

One possible embodiment of an entertainment module is now considered. The entertainment module is configured with any number of electronic devices used by people for enjoyment purposes. Typical examples of such electronic devices include MP3 players, CD players, DVD players, and gaming computers such as GameBoy®. The entertainment module may further comprise an LCD display. As described above, such devices may be HAVi enabled to facilitate inter-modular communications. For example, lights associated with a signaling device may be activated in response to music played by a CD player associated with an entertainment module.

The next module considered is a clock module. The clock module is a time keeping device configured to display the time in at least one time zone. The clock module preferably comprises its own power source which may be electrically associated with power bus (112). Additionally, the clock module may be electrically associated with microcontroller (210) through communication bus (110). The clock module may be configured to maintain an accurate time for the smart container system. One embodiment of such a clock module would comprise "Atomic clock" technology that sets/resets itself using a 60 kHz VLF radio time signal transmitted by NIST.

The clock module may further comprise alarm clock functionality to signal a user when a preset time has been reached. This feature may be particularly useful when traveling by eliminating the need for the user to learn how to operate an unfamiliar alarm clock. Additionally, the clock module may further be configured to display the time in a plurality of time zones. Such a clock module might be particularly useful when traveling to other time zones by allowing the user to maintain readouts of his home time zone and the time for a different time zone.

The next module considered is a location determination module. The location determination module is configured with electronic equipment for determining the location of the smart container. Such technology includes GPS (Global Positioning System) basted technologies as well as other technologies such as those based on cellular phone transmissions. For the preferred embodiment, an electronic module comprising a GPS receiver is electrically associated with a module bay. The GPS receiver is configured to determine the containers position and generate position-data. Such position-data is preferably available to microcontroller (210) through communication buss (110).

For still another embodiment of the invention, smart container (10) comprises a plurality of location determination devices detachably associated with the smart container. For this embodiment, a location determination device is associated with each member of a group of users. As the group explores the area around the smart container, position-data for each user is periodically transmitted to smart container (10) thereby forming a monitoring center. Microcontroller (210) is further configured to display the position-data on a display device or module associated with smart container (10). For the purposes of this document, periodically transmitting a signal means to transmit a signal at set intervals and random intervals.

The next module considered is a display module. The display module may comprise any of a number of technologies for displaying information to a user. For the preferred embodiment, the display device complies with at least one of the following criteria: small footprint, light weight, low power consumption, completely flat screen, crisp picture comprised of digital and uniform colors, and fully digital signal processing technology with low electromagnetic emissions. One possible embodiment of such a display comprises Liquid Crystal Display (LCD) technology, such as display (30) shown in FIG. 3. As with the other modules, the display module may be associated with the communication bus (112) and the power bus (110). The display module may further comprise video and audio output ports and input ports for connecting the display module to external electronic devices, such as a PlayStation® or a DVD player.

By way of example, one possible smart container system is examined to further illustrate the various aspects of one embodiment of the invention. For this embodiment of the invention, the smart container is a bag such as book bags carried by students (although such a bag may be used in any number of ways to transport items other than books). For this exemplary embodiment, the book bag comprises an electronic signaling element comprising at least one of (a) a light emitting source and (b) a sound emitting source. For example, in a child's book bag, the signaling element may be lights positioned around the perimeter of the book bag. The book bag further includes a user interface configured for receiving user input. The user interface may be a wired or wireless interface. One embodiment of a wireless user interface would be a watch configured with a transmitter. The user interface and the electronic signaling device is further associated with a processing device.

The processing device is associated with a memory and configured for controlling/monitoring the book bag components. The book bag is further configured with a motion sensor electrically associated with said processing device and configured for generating motion-data. Motion-data may be any type of data that is used by the processing device to determine when the book bag is moving. The processor is further configured to activate the electronic signaling device in response to at least one of (a) motion-data, and (b) user input. For example, the processor may be figured to monitor the book bag for motion and upon detecting motion, activating the signal device to catch the attention of the user. Alternatively, upon detecting motion, the processor may be configured to activate the signaling device in a predefined pattern (similar to lights used in children's shoes). For some embodiments, the predefined pattern may be defined by a user. Additionally, for embodiments comprising a communication port or similar communication technology described above, the predefined patterns may be shared between different book bags allowing friends to share their light patterns.

The book bag further comprises a power source electrically associated with the processing device and said signaling device. One possible power source is a magnetic device associated with a wheel (for books bag embodiments having wheels). Alternatively, the power source may be a battery or a flexible photovoltaic cell associated with the book bag.

The book bag may further comprise a receiver electrically associated with the processing device. The receiver is configured for receiving a data-signal transmitted from an electronic device. The processing device is further configured to activate the electronic signaling element in response to a received data-signal. For example, the received data-signal may be transmitted by a transmitter associated the user, such as a watch or a key chain transmitter. This feature would be useful in locating the book bag among a group of book bags or for locating a lost book bag.

The book bag may further comprise a recording device electrically associated with the processing device and configured for generating recorder-data. Exemplary embodiments of a recording device comprise at least one of (a) an image recording element and (b) a sound recording element (as described earlier in this document). The processing device is further configured to activate said recording device in response to one of (a) user input and (b) a received data-signal (a wireless communication). With such a configuration, a user can use the book bag to record a class lesson, an event at school, or an emergency situation. For example, a child is approached by a person intending to do harm to the child. The child presses a panic button, perhaps associated with the book bag or a watch transmitter (as described earlier). The processing device would immediately begin recording image and sound data and activate the signaling device.

The book bag may further comprise a transmitter electrically associated with the processing device and configured for transmitting a data-signal to a remote location. For this embodiment, the processing device is configured to activate the transmitter and transmit a data-signal in response to at least one of (a) user input, and (b) a received data-signal (as described previously). The transmitted data signal comprises one of (a) at least part of said motion-data, and (b) at least part of said recorder-data. Continuing the child adduction example described above, when the child presses the panic button, the recorder-data is immediately transmitted to a remote location such as a monitoring station and/or a parent. The transmitter may comprise cellular technology as well as other well known communication technologies.

The book bag may further comprise a flexible photovoltaic cell configured for supplying power to at least one of (a) said power source, and (b) the electronic components associated with the book bag. Such photovoltaic cell technology was described earlier.

The book bag may further comprise a transceiver electrically associated with said processing device. Suitable transceiver technologies include Bluetooth and Wi-Fi. With this technology, a student can listen to (and share with other students) music played by an electronic device associated with the processing device. Students may talk among themselves using Bluetooth enabled headsets. More importantly, a student could better listen to a class lecture given in a large lecture hall where the speaker's voice is transmitted by a Bluetooth transmitter.

Some embodiments of the book bag further comprise at least one module bay configured for receiving an electronic module such as the electronic modules described earlier. A communication bus is electrically associated with at least one module bay and the processing device. A power bus electrically associated with said at least one module bay and said processing device.

Another embodiment of the book bag comprises a frame associated with the container. A first wheel is positioned at a first location on the frame and a second wheel positioned at a second location on said frame. An extendable handle is associated with the frame and configured to adjustably extend from the frame to a position that allows a user to rest the container on said first wheel and said second wheel when moving the container. A magnetic device is associated with at least one wheel and is configured for generating power when the wheel is rotating. Alternatively, a magnetic device configured for generating an oscillating magnetic field may be associated with the smart container. One embodiment of a magnetic device configured for generating an oscillating magnetic field is a magnet associated with a rod and configured to slide back and forth across the rod when the smart container is moved. A coil of wire surrounds the rod so that the oscillating magnetic flux lines induce a current in said coil. The output of the magnet device is electrically associated with at least one of (a) said power bus, (b) said signaling device, (c) said power source, and (d) said controller.

Attention is now directed to methods for monitoring a container used for transporting items while traveling. For one preferred method, the first step is to associate a controller with the container. As before, the controller may comprise any number of electronic devices and is associated with a memory. Additionally, the controller is electrically associated with at least one electronic module and a power source.

As noted above, the electronic module may comprise any number of electronic devices including communication modules, location determination modules, entertainment modules, and security modules. For one embodiment of the present method, the electronic module is configured to monitor a container-parameter and generate a data-signal relating to said predefined parameter. A container-parameter is simply any environmental or container attribute that is quantifiable by an electronic data-signal. Examples of container-parameters include temperature, location information, pressure, acceleration, light, motion, images, sound, electromagnetic waves, voltage, current, and power.

The controller is configured to perform any number of predefined functions in response to said data-signal. For example, upon detecting motion, the controller may activate a signaling device, transmit a signal to a remote electronic device, or verify that an electronic lock is locked (and if not, initiate a lock signal).

While the present subject matter has been described in detail with respect to specific embodiments thereof, it will be appreciated that those skilled in the art, upon attaining an understanding of the foregoing may readily adapt the present technology for alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. A smart container for holding items while transporting said items from a first location to a second location, said smart container suitable for being manually moved by a person, said smart container comprising:
    at least one compartment defining a void for holding items within said compartment, said compartment comprising a first section releasably associated with a second section and wherein said void is defined between said first section and said second section;
    at least one module bay associated with at least one of said first section and said second section, said module bay comprising a bay communication port and a bay power port, and wherein said module bay is configured for being mechanically associated and electrically associated with an electronic module;
    a controller mechanically associated with one of said first section, said second section, and a module bay, said controller comprising a processing device electrically associated with a memory;
    wherein said controller is electrically associated with said bay communication port, said controller configured for at least one of (a) receiving data from an electronic module electrically associated with said bay communication port, and (b) sending data to an electronic module electrically associated with said bay communication port;
    a signaling device electrically associated with said controller, wherein said signaling device is one of: (a) an electronic module associated with said module bay, and (b) an integral electric device;
    a user interface electrically associated with said controller, said user interface configured for receiving user input and wherein said controller is further configured to place said signaling device in a signaling mode in response to at least one of (a) user input, (b) data received from an electronic module mechanically associated with a module bay and electrically associated with said controller, (c) data received from an integral device electrically associated with said controller, and (d) a program routine;
    a power buss electrically associated with said bay power port and said controller;
    a first wheel positioned at a first location and a second wheel positioned at a second location and wherein said first wheel and said second wheel extend at least partially beyond the outside perimeter of said smart container;
    a vacuum pump configured for being associated with a vacuum pack, said vacuum pump electrically associated with said power buss;
    a power source electrically associated with said power bus; and
    wherein at least one exterior surface of said smart container is associated with a photovoltaic cell, said photovoltaic cell configured for supplying power to at least one of (a) a device electrically associated with said power buss, (b) said power source, and (c) said controller.

2. A smart container as in claim 1, wherein said vacuum pump is electrically associated with said controller.

3. A smart container as in claim 2, wherein said vacuum pump is one of (a) a device integral to said smart container, and (b) an electronic module mechanically associated with said at least one module bay and electrically associated with said power buss through said bay power port and electrically associated with said controller through said bay communication port.

4. A smart container as in claim 1, wherein said smart container further comprises a removable pack that is configurable as both a vacuum pack and an inflatable pack.

5. A smart container as in claim 1, wherein said power source is a power storage module received by a second module bay electrically associated with said power bus and wherein said power storage module comprises at least one of (a) a power status indicator, and (b) a power transfer port.

6. A smart container as in claim 1, further comprising an electronic module releasably associated with a module bay, said electronic module comprising at least one of (a) a module communication port configured for being electrically associated with said bay communication port, and (b) a module communication port configured for being electrically associated with said bay power port.

7. A smart container as in claim 6, wherein said electronic module is an electronic module selected from the group of electronic modules consisting of: (a) a communication module; (b) a security module; (c) a recording module; (d) an entertainment module; (e) a time module; (f) a location module; and (g) a power module.

8. A smart container as in claim 6, further comprising:
    a transceiver electrically associated with said controller;
    wherein said controller is further configured to use said transceiver to facilitate data transfers between at least two of (a) an external electronic device, (b) said controller, (c) an electronic module, and (d) an integral electronic device.

9. A smart container as in claim 8, wherein said transceiver comprises one of (a) Bluetooth technology, and (b) Wi-Fi technology.

10. A smart container as in claim 1, further comprising:
    an antenna;
    a receiver electrically associated with said antenna and said controller;
    wherein said controller is further configured to use said receiver to receive data signals transmitted from at least one of (a) an external electronic device, and (b) an electronic module associated with said module bay.

11. A smart container as in claim 10, wherein said external electronic device is one of (a) a portable transmitter associated with a user, and (b) a transmitter remote to said user.

12. A smart container as in claim 10, further comprising an electronic lock configured to secure said first section to said second section wherein said controller is configured to change the status of the electronic lock in response to a signal received from said external-electronic-device.

13. A smart container as in claim 1, wherein said signaling device comprises at least one of (a) a light emitting device, and (b) a sound emitting device.

14. A smart container as in claim 13, further comprising a receiver electrically associated with an antenna and said controller wherein said receiver is configured for receiving transmitted data signals and wherein said controller is further configured to place the signaling device in a predefined signaling mode in response to a received data signal.

15. A backpack used for holding items, said backpack comprising:
- at least one compartment configured for holding items, said compartment comprising at least one section;
- at least one module bay mechanically associated with said at least one compartment, wherein said at least one module bay is configured for releasably receiving an electronic module, and wherein at least one of said at least one module bay comprises a bay power port configured for being electrically associated with said electronic module;
- a controller comprising a processing device electrically associated with a memory;
- a power source;
- a signaling device electrically associated with said controller, wherein said signaling device is one of: (a) an electronic module associated with said module bay, and (b) an integral electric device;
- a user interface electrically associated with said controller, said user interface configured for receiving user input and wherein said controller is further configured to place the signaling device in a signaling mode in response to at least one of (a) user input, (b) data received from an electronic module mechanically associated with a module bay and electrically associated with said controller, (c) data received from an integral device electrically associated with said controller, and (d) a program routine;
- a power bus electrically associated with said power source, said controller, and said bay power-port; and
- wherein at least one exterior surface of said backpack is associated with an energy converter comprising a photovoltaic cell, said energy converter configured for supplying power to at least one of (a) a device electrically associated with said power buss, (b) said power source, and (c) said controller.

16. A backpack as in claim 15, wherein said controller is further electrically associated with a receiver and wherein said user input is a signal transmitted by at least one of (a) a portable transmitter associated with a user, and (b) a remote transmitter associated with a monitoring device.

17. A backpack as in claim 15, wherein in said backpack further comprises at least one communication port electrically associated with said controller.

18. A backpack as in claim 15, wherein said signaling device is one of (a) at least one light, and (b) at least one sound emitter, and wherein said controller is further configured to transfer said signaling mode to an external device.

19. A bag used for holding items while transporting said items from a first location to a second location, said container configured for being carried by a person, said bag comprising:
- at least one compartment for holding items, said compartment comprising at least one section;
- an electronic signaling device electrically associated with a controller comprising a processing device electrically associated with a memory;
- a user interface electrically associated with said controller, said user interface configured for receiving user input and wherein said controller is further configured to place the signaling device in a signaling mode in response to at least one of (a) user input, (b) data received from an integral device electrically associated with said controller, and (c) a program routine;
- a motion sensor electrically associated with said processing device wherein said motion sensor is configured for generating motion-data;
- a receiver electrically associated with said processing device, said receiver configured for receiving a transmitted data-signal, and wherein said processing device is further configured to activate said electronic signaling device in response to a received data-signal;
- a recording device electrically associated with said processing device, said recording device configured for generating recorder-data and wherein said recording device comprises at least one of (a) an image recording device and (b) a sound recording device, and wherein said processing device is further configured to activate said recording device in response to one of (a) user input and (b) a received data-signal;
- a transmitter electrically associated with said processing device, said transmitter configured for transmitting a transmitted data-signal and wherein said processing device is further configured to generate said transmitted data-signal in response to at least one of (a) user input, and (b) a received data-signal and wherein said transmitted data signal comprises one of (a) at least part of said motion-data, and (b) at least part of said recorder-data;
- wherein said processing device is configured to activate said electronic signaling device in response to at least one of (a) motion-data, and (b) user input;
- a power source; and
- a power buss electrically associated with said power source, said processing device, and said signaling device, said power buss configured for transferring power; and
- wherein at least one exterior surface of said bag is associated with a photovoltaic cell, said photovoltaic cell configured for supplying power to at least one of (a) a device electrically associated with said power buss, (b) said power source, and (c) said signaling device.

20. A bag used for holding items while transporting said items from a first location to a second location as in claim 19, wherein said bag is a backpack.

21. A bag used for holding items while transporting said items from a first location to a second location as in claim 19, wherein said bag is a book bag.

22. A bag used for holding items while transporting said items from a first location to a second location, said bag configured for being carried by a person, said bag comprising:
- at least one compartment for holding items, said compartment comprising at least one section;
- an electronic signaling device;
- a user interface electrically associated with said controller, said user interface configured for receiving user input and wherein said controller is further configured to place the signaling device in a signaling mode in response to at least one of (a) user input, (b) data received from an electronic module mechanically associated with a module bay and electrically associated with said controller, (c) data received from an integral device electrically associated with said controller, and (d) a program routine;

an integral processing device electrically associated with a memory, said processing device further electrically associated with said electronic signaling device and said user interface;

a motion sensor electrically associated with said processing device wherein said motion sensor is configured for generating motion-data;

a receiver electrically associated with said processing device, said receiver configured for receiving a transmitted data-signal, and wherein said processing device is further configured to activate said electronic signaling device in response to a received data-signal;

a recording device electrically associated with said processing device, said recording device configured for generating recorder-data and wherein said recording device comprises at least one of (a) an image recording device and (b) a sound recording device, and wherein said processing device is further configured to activate said recording device in response to one of (a) user input and (b) a received data-signal;

a transmitter electrically associated with said processing device, said transmitter configured for transmitting a transmitted data-signal and wherein said processing device is further configured to generate said transmitted data-signal in response to at least one of (a) user input, and (b) a received data-signal and wherein said transmitted data signal comprises one of (a) at least part of said motion-data, and (b) at least part of said recorder-data;

wherein said processing device is configured to activate said electronic signaling device in response to at least one of (a) motion-data, and (b) user input;

a power source;

a power buss electrically associated with said power source, said processing device, and said signaling device, said power buss configured for transferring power; and wherein at least one exterior surface of said bag is associated with a photovoltaic cell, said photovoltaic cell configured for supplying power to at least one of (a) a device electrically associated with said power buss, (b) said power source, and (c) said signaling device.

23. A bag used for holding items while transporting said items from a first location to a second location as in claim 22, wherein said emergency routine comprises at least one step from the group of steps consisting of:

(i) recording at least one of (a) image data, and (b) sound data;

(ii) activating said signaling device; and (iii) transmitting a data-signal to a remote location, said data-signal comprising at least one of (a) at least part of said image data, and (b) at least part of said sound data.

24. A bag used for holding items while transporting said items from a first location to a second location as in claim 22, further comprising:

a transceiver electrically associated with said processing device;

wherein said processing device is further configured to use said transceiver to facilitate data transfers between at least two of (a) an external-electronic-device, (b) said processing device, and (c) an integral electronic device.

25. A bag used for holding items while transporting said items from a first location to a second location as in claim 19, further comprising:

at least one module bay associated with said at least one compartment, said at least one module bay configured for releasably receiving an electronic module, and wherein at least one of said at least one module bay comprises a bay communication port and a bay power port;

a communication bus electrically associated with said bay communication port and said processing device; and a power bus electrically associated with said bay power port and said processing device.

26. A bag used for holding items while transporting said items from a first location to a second location as in claim 19, further comprising:

a frame associated with said bag;

a first wheel positioned at a first location defined by said frame;

a second wheel positioned at a second location defined by said frame;

a magnetic device associated with at least one of said first wheel and said second wheel and configured for generating power when said at least one of said first wheel and said second wheel is rotating; and wherein the output of said magnet device is electrically associated with at least one of (a) said power bus, (b) said signaling device, (c) said power source, and (d) said controller.

* * * * *